United States Patent
Zhu et al.

(10) Patent No.: US 10,667,187 B2
(45) Date of Patent: May 26, 2020

(54) METHOD AND APPARATUS FOR DETERMINING A BEARER FOR MOBILE EDGE COMPUTING

(71) Applicant: HUAWEI TECHNOLOGIES CO., LTD., Shenzhen, Guangdong (CN)

(72) Inventors: Qianghua Zhu, Beijing (CN); Chunshan Xiong, Beijing (CN); Xiaoyan Shi, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 77 days.

(21) Appl. No.: 15/965,012

(22) Filed: Apr. 27, 2018

(65) Prior Publication Data
US 2018/0249389 A1 Aug. 30, 2018

Related U.S. Application Data

(63) Continuation of application No. PCT/CN2015/093215, filed on Oct. 29, 2015.

(51) Int. Cl.
*H04W 4/00* (2018.01)
*H04W 36/06* (2009.01)
(Continued)

(52) U.S. Cl.
CPC ......... *H04W 36/06* (2013.01); *H04L 61/2007* (2013.01); *H04W 36/0033* (2013.01);
(Continued)

(58) Field of Classification Search
None
See application file for complete search history.

(56) References Cited

U.S. PATENT DOCUMENTS

| 2009/0225725 A1 | 9/2009 | Zhu |
| 2011/0255471 A1 | 10/2011 | Sundell et al. |

(Continued)

FOREIGN PATENT DOCUMENTS

| CN | 101193449 A | 6/2008 |
| CN | 102473163 A | 5/2012 |

(Continued)

OTHER PUBLICATIONS

XP014250180 Fabio Giust:NED Europe Ltd,"MEC Mobility Management:MEC(15)000165",ETSI Draft, dated Jul. 14, 2015,total 10 pages.

(Continued)

*Primary Examiner* — Elisabeth Benoit Magloire
(74) *Attorney, Agent, or Firm* — Womble Bond Dickinson (US) LLP

(57) ABSTRACT

Method and an apparatus for determining a bearer for mobile edge computing are disclosed. A Mobile Edge Computing (MEC) can obtain a data packet that includes an end marker. The MEC can obtain a bearer identifier and an identifier of UE in a handover procedure according to the data packet that includes the end maker, and requests information about the second bearer from a node of a second bearer. The request can include the bearer identifier of the UE and the identifier of the UE. The node of the second bearer can return a response message and information regarding the second bearer according to the request. The MEC can receive the response message and store the information regarding the second bearer according to the identifier of the UE and the bearer identifier of the UE.

20 Claims, 12 Drawing Sheets

(51) Int. Cl.
| | |
|---|---|
| *H04W 36/00* | (2009.01) |
| *H04L 29/12* | (2006.01) |
| *H04W 36/12* | (2009.01) |
| *H04W 88/02* | (2009.01) |
| *H04W 88/08* | (2009.01) |
| *H04W 88/16* | (2009.01) |

(52) U.S. Cl.
CPC ...... *H04L 61/1588* (2013.01); *H04L 61/2592* (2013.01); *H04W 36/12* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 2013/0028237 A1* | 1/2013 | Cheng | H04W 36/0016 370/331 |
| 2013/0058308 A1* | 3/2013 | Jaiswal | H04W 36/12 370/331 |
| 2013/0083721 A1* | 4/2013 | Wu | H04W 36/0055 370/315 |
| 2013/0107863 A1* | 5/2013 | Faccin | H04W 36/0022 370/331 |
| 2014/0010142 A1 | 1/2014 | Ranta-Aho et al. | |
| 2015/0103665 A1* | 4/2015 | Kaippallimalil | H04W 76/10 370/235 |
| 2015/0215418 A1 | 7/2015 | Li et al. | |
| 2015/0365819 A1 | 12/2015 | Zhu et al. | |
| 2016/0135103 A1* | 5/2016 | Lee | H04W 28/08 455/444 |
| 2016/0212661 A1* | 7/2016 | Basu Mallick | H04L 1/1614 |
| 2016/0249402 A1* | 8/2016 | Zhang | H04W 68/08 |
| 2016/0262073 A1* | 9/2016 | Muley | H04L 43/0876 |
| 2016/0337919 A1* | 11/2016 | Bindrim | H04L 65/4084 |
| 2017/0111280 A1* | 4/2017 | Zhang | H04W 28/16 |
| 2019/0059067 A1* | 2/2019 | Lee | H04W 60/04 |
| 2019/0074894 A1* | 3/2019 | Gopal | H04B 7/18584 |
| 2019/0098682 A1* | 3/2019 | Park | H04L 5/001 |
| 2019/0159070 A1* | 5/2019 | Wei | H04W 28/12 |
| 2019/0191471 A1* | 6/2019 | Yoshikawa | H04W 76/32 |

FOREIGN PATENT DOCUMENTS

| | | |
|---|---|---|
| CN | 103430516 A | 12/2013 |
| CN | 103493536 A | 1/2014 |
| WO | 2015018489 A1 | 2/2015 |

OTHER PUBLICATIONS

XP014250137 Saguna et al:"Use Case:MEC Virtualized IP Flow Mobility Function—MEC(15)000117a1r2",dated Jun. 30, 2015,total 2 pages.

ETSI GS MEC-IEG 005 V1.1.1(Aug. 2015):"Mobile-Edge Computing (MEC); Proof of Concept Framework", total 14 pages.

\* cited by examiner

METHOD AND APPARATUS FOR DETERMINING A BEARER FOR MOBILE EDGE COMPUTING

CROSS-REFERENCE TO RELATED APPLICATIONS

This application is a continuation of International Application No. PCT/CN2015/093215, filed on Oct. 29, 2015, the disclosure of which is hereby incorporated by reference in its entirety.

TECHNICAL FIELD

The present application relates to the field of data communication technologies, and in particular, to a method and an apparatus for determining a bearer for mobile edge computing.

BACKGROUND

With continuous development of technology, data communication based on an evolved packet system and Mobile Edge Computing (MEC) systems are widely applied. MEC technologies can create highly distributed environments for deployment of applications and services, and process data on a user plane. The highly distributed environments are mainly located on a Radio Access Network (RAN) side. A lower-layer node of MEC is an access network device, and an upper-layer node of the MEC is a serving gateway. As such, MEC systems can be close to User Equipment (UE), the access network device, and the serving gateway, and has a predominant position advantage to easily obtain network information related to the UE. MEC systems can thus provide the UE with local services having small delays, fast access, and high bandwidths.

As UE continuously move, the UE can be handed over from a first access network device to a second access network device. After the handover, a new bearer is set up for the UE between the second access network device and a serving gateway. Because MEC systems are located between the second access network device and the serving gateway, and the MEC system stores only information regarding an old bearer after the handover of the UE, data may be correctly transmitted to the UE, thereby adversely affecting communication for the UE.

SUMMARY

Embodiments of the present application provide a method and an apparatus for determining a bearer for mobile edge computing. Embodiments include a MEC that can determine a bearer for UE after a handover of the UE, and the MEC can communicate with the UE.

According to one embodiment, a method for determining a bearer for mobile edge computing is disclosed. The method can be applied to a handover procedure of user equipment UE from a source access network device (such as, e.g., a source base station or a source base station controller) to a target access network device (such as, e.g., a target base station or a target base station controller). Data of the UE can be handed over from a bearer between the source access network device and a source serving gateway (such as, e.g., a source SGW or a source SGSN) to a bearer between the target access network device and a target serving gateway (such as, e.g., a target SGW or a target SGSN).

For one embodiment, a method includes a MEC obtaining a data packet that includes an end marker. For example, during a handover of the UE, the source serving gateway can send to the source access network device the data packet that includes the end marker. The end marker can be used to indicate to the source access network device that the handover of the UE occurs. The marker can be transparently delivered by using the MEC. The MEC can obtain the data packet that includes the end marker and sent by the source serving gateway, or the source serving gateway sends the data packet that includes the end marker to the MEC. The MEC obtains, according to the data packet that includes the end marker, a bearer identifier and an identifier of the UE in a handover procedure, and requests information about the second bearer from a node of a second bearer. The request can include the bearer identifier of the UE and the identifier of the UE. The node of the second bearer can return a response message and the information about the second bearer according to the request. The MEC can receive the response message. The MEC can store the information regarding the second bearer according to the identifier of the UE and the bearer identifier of the UE, for example, can replace information regarding a first bearer with the information regarding the second bearer that corresponds to the identifier of the UE and the bearer identifier of the UE, or directly stores the information regarding the second bearer corresponding to the identifier of the UE and the bearer identifier of the UE.

According to one embodiment, after a handover of the UE to an access network device communicating with the UE occurs, the MEC can accurately determine the information about the second bearer of the UE in time, so that the UE can normally communicate with the MEC.

According to one embodiment, the data packet includes the end marker and can further include a tunnel endpoint identifier TED of the first bearer. For one embodiment, according to the data packet that includes the end marker, a bearer identifier and an identifier of the UE in a handover procedure may include: determining the identifier of the UE and the bearer identifier of the UE according to the TED of the bearer that is included in the data packet that includes the end marker, for example, by receiving an IP address that is of the UE and that corresponds to the bearer in the data packet that includes the end marker; or determining a data packet that corresponds to the bearer of the received data packet that includes the end marker and that is stored in the MEC, and determining an IP address of the UE according to the data packet. The bearer identifier of the UE can be the TEID of the first bearer. For example, for the requesting information regarding the second bearer from a node of a second bearer, the information regarding the second bearer is requested from a core network information service CNIS. For one embodiment, the information regarding the second bearer can be requested from the CNIS by using the UE IP and the TED of the first bearer.

According to one embodiment, obtaining a bearer identifier and an identifier of the UE in a handover procedure may include determining an identifier of a node of the first bearer according to the data packet that includes the end marker. For example, the MEC can pre-store identifiers of various bearer nodes, determine, according to a TED of a bearer that is included in the data packet that includes the end marker, the identifier that is of the node of the first bearer and that corresponds to the bearer, or further determines, according to an IP address of the source access network device that is included in the data packet that includes the end marker, the identifier that is of the node of the first bearer and that corresponds to the access network device, and requests the identifier of the UE and the bearer identifier of the UE from the node of the second bearer. The request can include a TEID of the first bearer. The node of the first bearer can return a response message according to the request, and the response message can include the identifier of the UE and the bearer identifier of the UE. The MEC can receive the response message. By means of the method, the MEC can request related information of the UE from the node of the first bearer, and further determine the information about the second bearer.

According to one embodiment, the node of the first bearer can be the source access network device, and the node of the second bearer can be the target access network device. The access network device can store a CRNIT or an S-TMSI of the UE. In addition, when the information about the second bearer is requested from the node of the second bearer by using the CRNIT of the UE, the request further can further include an identifier of the source access network device. For one embodiment, the CRNIT or S-TMSI and the bearer identifier of the UE can be requested from the source access network device, and the information about the second bearer can be requested from the target access network device.

According to one embodiment, the node of the first bearer can be the source serving gateway. When the handover is a handover between different systems, the source serving gateway can be a source SGSN of the UE, and the node of the second bearer can be a target MME or a target SGSN of the UE; or when the handover is a handover within a same system, the source serving gateway and the node of the second bearer can both be an SGSN that serves the UE. For example, the corresponding identifier of the UE can be an IMSI, an IP and an APN, or an MSISDN.

According to one embodiment, the obtaining a bearer identifier and an identifier of the UE according to the data packet including the end marker in a handover procedure may include: determining an identifier of the source serving gateway according to the data packet that includes the end marker. For example, the MEC can pre-store identifiers of various serving gateways. For one embodiment, according to a TEID of a bearer that is included in the data packet that includes the end marker, the identifier that is of the serving gateway and that corresponds to the bearer. Alternatively, the data packet that includes the end marker includes an IP address of the source serving gateway, related information of the UE is found according to the IP address, and the identifier of the source serving gateway is obtained. The MEC can send a request message that includes a TEID of the first bearer to the source serving gateway according to the identifier of the source serving gateway, to request an identifier of a node of the first bearer. The MEC can receive a response message sent by the source serving gateway, where the response message includes the identifier of the node of the first bearer. The MEC can send, according to the identifier of the node of the first bearer, a request message that includes the TEID of the first bearer, to request the identifier of the UE and the bearer identifier of the UE. The MEC can receive a response message sent by the node of the first bearer, where the response message includes the identifier of the UE and the bearer identifier of the UE. The identifier of the UE can be an IMSI, an IP and an APN, or an MSISDN. For one embodiment, the MEC can determine the first bearer by using the source serving gateway, and further determine the information about the second bearer.

According to one embodiment, the source serving gateway can be an SGW. When the handover is a handover between different systems, the node of the first bearer can be a source MME of the UE, and the node of the second bearer can be a target MME or a target SGSN of the UE; or when the handover is a handover within a same system, the node of the first bearer and the node of the second bearer can both be an MME that serves the UE.

According to one embodiment, the bearer identifier of the UE can be an EPS bearer identifier, or an ERAB bearer identifier, or an S1 bearer identifier.

In some embodiments, the source serving gateway and the target serving gateway can be a same serving gateway.

According to one embodiment, an apparatus for determining a bearer for a mobile edge computing can be configured to implement methods disclosed herein and includes a first obtaining unit, a second obtaining unit, a sending unit, a receiving unit, and a storage unit. The first obtaining unit can be configured to obtain a data packet that includes an end marker. The second obtaining unit can be configured to obtain a bearer identifier of UE and an identifier of the UE according to the data packet that includes the end marker. The sending unit can be configured to send a request message to a node of a second bearer, where the request message includes the bearer identifier of the UE and the identifier of the UE, and is used to request information about the second bearer. The receiving unit can be configured to receive a response message sent by the node of the second bearer, where the response message includes the information about the second bearer. The storage unit can be configured to store the information about the second bearer according to the identifier of the UE and the bearer identifier of the UE.

According to one embodiment, the second obtaining unit can include a first determining subunit, a first sending subunit, and a first receiving subunit. The first determining subunit can be configured to determine an identifier of a node of a first bearer according to the data packet that includes the end marker. The first sending subunit can be configured to send a request message that includes a TEID of the first bearer to the node of the first bearer according to the identifier of the node of the first bearer, where the request message is used to request the identifier of the UE and the bearer identifier of the UE. The first receiving subunit can be configured to receive a response message sent by the node of the first bearer, where the response message includes the identifier of the UE and the bearer identifier of the UE.

According to one embodiment, the second obtaining unit can include a second determining subunit, a second sending subunit, a second receiving subunit, a third sending subunit, and a third receiving subunit. The second determining subunit can be configured to determine an identifier of a source serving gateway according to the data packet that includes the end marker. The second sending subunit can be configured to send a request message that includes the TEID of the first bearer to the source serving gateway according to the identifier of the source serving gateway, where the request message is used to request an identifier of a node of the first bearer of the UE. The second receiving unit can be configured to receive a response message sent by the source serving gateway, where the response message includes the identifier of the node of the first bearer. The third sending subunit can be configured to send, according to the identifier of the node of the first bearer, a request message that includes the TED of the first bearer, where the request message is used to request the identifier of the UE and the bearer identifier of the UE. The third receiving subunit can be configured to receive a response message sent by the node of the first bearer, where the response message includes the identifier of the UE and the bearer identifier of the UE.

According to one embodiment, an apparatus for determining a bearer for a mobile edge computing can be configured to implement methods disclosed herein and include a processor, a memory, a communications interface, and a bus. The processor, the memory, and the communications interface can communicate with one another by using the bus. The communications interface can be configured to communicate with UE, a source access network device, a target access network device, a source serving gateway, a target serving gateway, a node of a first bearer, or a node of a second bearer. The memory can be configured to store a program. When the device operates, the processor can be configured to execute the program stored in the memory and perform the methods disclosed herein.

BRIEF DESCRIPTION OF DRAWINGS

The present embodiments will be more fully understood from the detailed description given below and from the accompany drawings showing various examples which, however, should not be taken to the limit the embodiments to specific examples, but for explanation and understanding only.

DESCRIPTION OF EMBODIMENTS

In the following embodiments, after a handover of UE occurs, a bearer node before a handover can store an identifier of a bearer node after the handover. In this way, the bearer node after the handover may be determined by using the bearer node before the handover, and information regarding a bearer after the handover may be requested from the bearer node after the handover. For example, mobile edge computing (MEC) can effectively determine the bearer that corresponds to the UE after the handover, thereby further implementing communication between a MEC and the UE. In the following embodiments, reference to MEC can include a MEC system.

Figure 1:
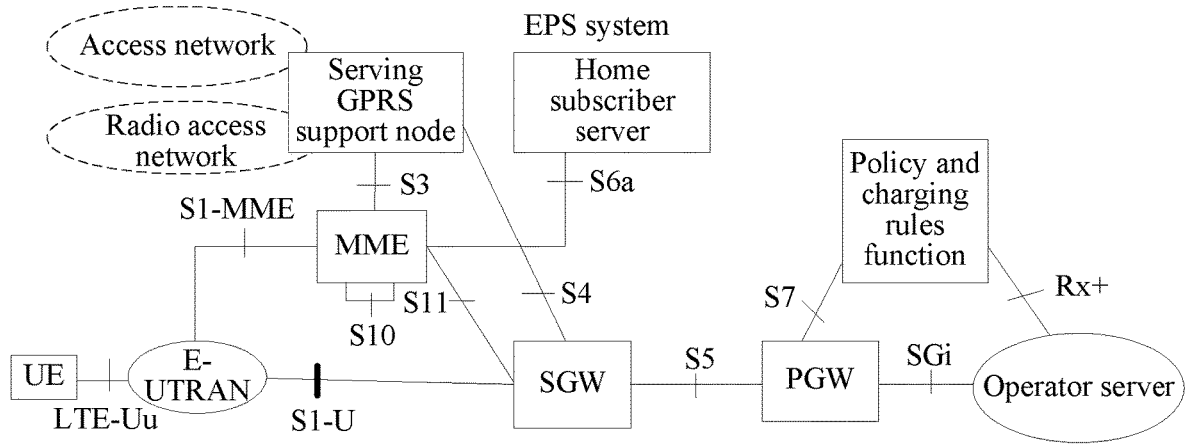
FIG. 1 is a schematic structural diagram of an EPS system.

The disclosed embodiments can be based on systems such as an Long Term Evolution (LTE) system, a Universal Mobile Telecommunications System (UMTS), and the like, and are especially applicable to an Evolved Packet System (EPS) of the LTE. EPS was introduced by the 3$^{rd}$ Generation Partnership Project (3GPP) standard committee in the fourth generation mobile communication. FIG. 1 is a schematic structural diagram of an EPS system. As shown in FIG. 1, the EPS can include user equipment (UE), an evolved universal terrestrial radio access network (E-UTRAN), an evolved packet core (EPC), and the like.

The EPC can include a mobility management entity (MME), a packet data network gateway (P-GW), an SGW, and the like, and can implement conventional capabilities of a mobile network such as storage of subscription data of a subscriber, mobility management, and data exchange and can provide ultrafast online experience for a user.

In addition, for one embodiment, the E-UTRAN may be a network including multiple eNBs (evolved NodeB), and can achieve functions such as a wireless physical layer function, resource scheduling and radio resource management, radio access control, and mobility management. The eNB can be connected to the SGW by using a user plane interface S1-U (on which the MEC is located), and transports user data by using a General Packet Radio System Tunneling Protocol User Plane (GTP-U). The eNB is connected to the MME by using a control plane interface S1-MME, and can achieve functions such as controlling of a radio access bearer.

The UMTS system can includes a universal terrestrial radio access network (UTRAN) and a core network (CN). The UTRAN can be a network which can include multiple base stations and a base station controller RNC (radio network controller). The core network CN includes Server GPRS Support Node (SGSN), and the SGSN can communicate with a base station by using a base station controller.

Figure 2:
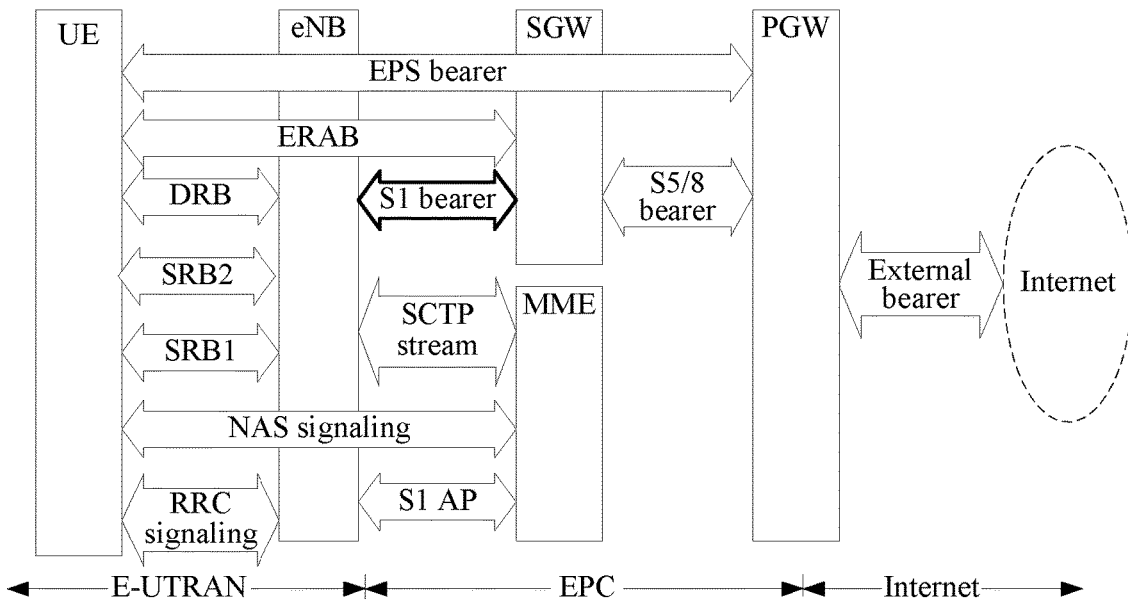
FIG. 2 is a schematic diagram of a bearer of an EPS system.

For one embodiment, a bearer can be configured to transport data of a particular service in a system between ends, and the bearer can be selected for transmission of the service when satisfying a specific service requirement. For example, FIG. 2 is a schematic diagram of a bearer of an EPS system. As shown in FIG. 2, an EPS bearer can be set up between UE and a PGW, and may be divided into two sections: an ERAB (E-UTRAN radio access bearer) and an S5/8 bearer. The ERAB can be set up between the UE and an SGW. The S5/8 bearer can be set up between the SGW and the PGW. In addition, the ERAB may be further divided into a DRB (data radio bearer) between the UE and an eNB and an S1 bearer between the eNB and the SGW.

For one embodiment, if there is data (which is usually downlink data) to be transmitted by using a bearer, a PGW or UE end can perform matching on the data with data packet filters in a specific order. A relationship between a data packet filter and a bearer can be bound when the bearer is set up or modified. Generally, one data packet filter corresponds to one tunnel identifier TED (tunnel endpoint identifier). For example, data matching may be performed according to a 5-tuple (a source IP, a destination IP, a source port, a destination port, a protocol) in the data. If the matching succeeds, the data can be encapsulated into a bearer bound to this data packet filter, or if the matching fails, a next data packet filter can be used for the matching.

Embodiments disclosed herein may be applied to the LTE or UMTS system, but are not so limited, and may also be applied other communication systems which can include a bearer between a base station and an SGW in which the MEC can join.

Figure 3:
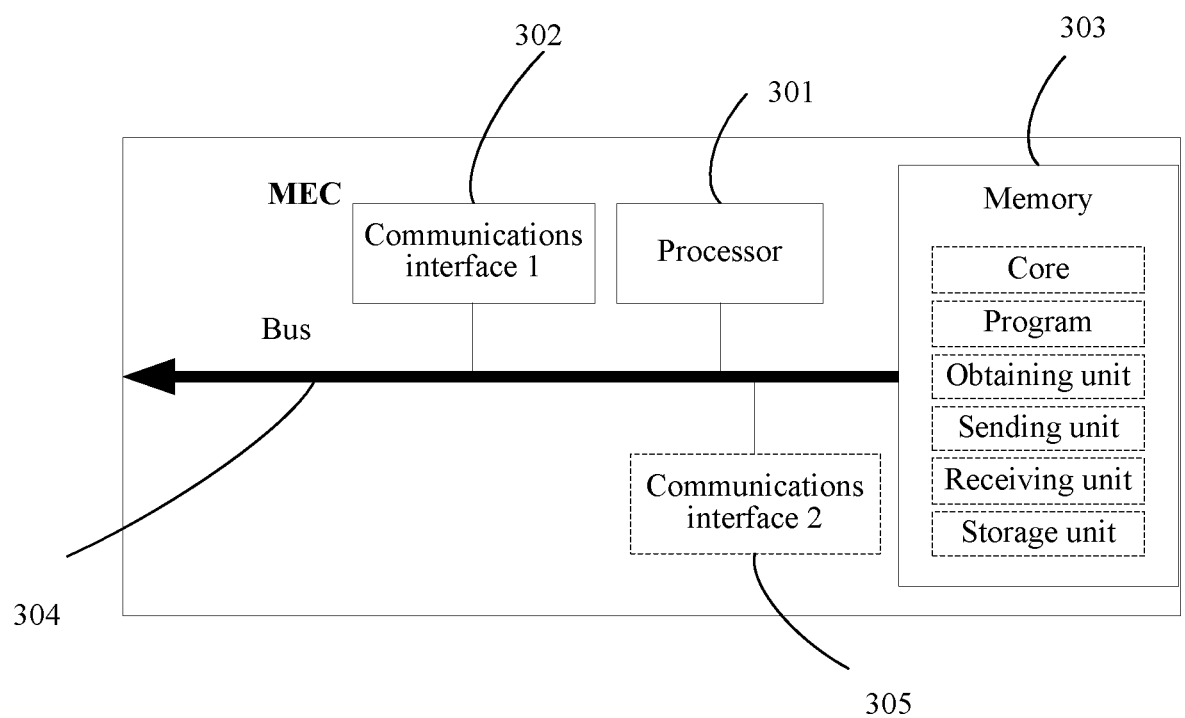
FIG. 3 is a schematic structural diagram of an apparatus for determining a bearer for a mobile edge computing according to one embodiment.

FIG. 3 is a schematic structural diagram of an apparatus for determining a bearer for a mobile edge computing according to one embodiment. The apparatus may be located in an LTE system, a UMTS system, or the like. As shown in FIG. 3, the MEC includes a processor 301 and a communication interfaces 302/305. A memory 303 and a bus 304 are further shown. The processor 301, the communication interfaces 302/305, and the memory 303 are connected by using the bus 304 providing communication. The memory 303 can be configured to store a program. The processor 301 can read the program stored in the memory, and can execute the program, to send and receive data and an instruction for an external device by using the communication interfaces 302/305.

For one embodiment, processor 301 may be one processor, or may be a general term of multiple processing elements. For example, the processor may be a central processing unit (CPU) or may be an application-specific integrated circuit (ASIC), or may be configured into one or more integrated circuits for implementing this embodiment of the present application, such as one or more microprocessors (DSP) or one or more field programmable gate arrays (FPGA).

For one embodiment, memory 303 may be one storage apparatus, or may be a general term of multiple storage elements, and is configured to store executable program code, or parameters, data, and the like required for running of an access network management device. Memory 303 may include a random access memory (RAM) or may include a non-volatile memory (non-volatile memory), such as a disk memory or a flash (Flash) memory.

For one embodiment, bus 304 may be an industry standard architecture (ISA) bus, a peripheral component interconnect (PCI) bus, an extended industry standard architecture (EISA) bus, or the like. Bus 304 may be classified into an address bus, a data bus, a control bus, and the like. For ease of representation, only one bold line is used in FIG. 3 for representation, but it does not represent that there is only one bus or one type of bus in which any number of types of busses may be used.

Figure 4:
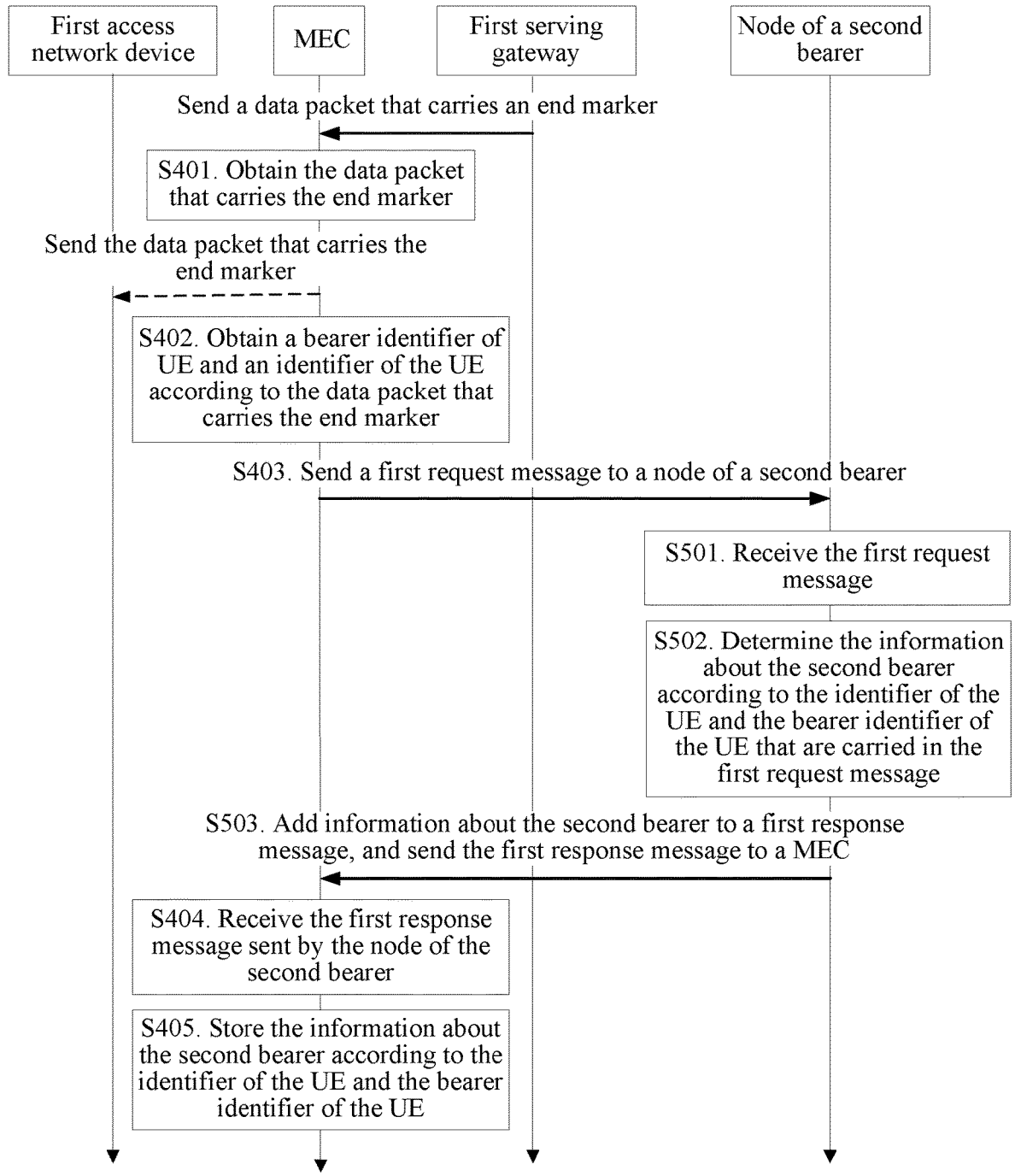
FIG. 4 is a flowchart of a method for determining a bearer for a mobile edge computing according to one embodiment.

FIG. 4 is a flowchart of a method for determining a bearer for a mobile edge computing according to one embodiment. The method of FIG. 4 may be performed by a MEC, such as the apparatus shown in FIG. 3. A program for implementing the method of FIG. 4 may be stored in the memory 303. The processor 301 can read the program stored in the memory and perform the method of FIG. 4. For one embodiment, processor 301 can send and receive data and an instruction for an external device by using the communication interfaces 302/305.

For one embodiment, the method shown in FIG. 4 is applicable to a handover procedure of UE from a first access network device to a second access network device. In this process, for example, data of the UE can be handed over for transmission from a first bearer between the first access network device (that is, a source access network device or an access network device before the handover) and a first serving gateway (that is, a source serving gateway, or a serving gateway before the handover) to a second bearer between the second access network device (that is, a target access network device, or an access network device after the handover) and a second serving gateway (that is, a target serving gateway, or a serving gateway after the handover).

Embodiments disclosed herein may be applied to the handover procedure of the UE. For one embodiment, the related handover can include a handover between access network devices, and may further include a handover between serving gateways.

For one embodiment, the handover may be an inter-system handover. For example, the handover may be a handover between a same type of system, such as a handover between LTE systems, or may be a handover between different types of systems, such as a handover between an LTE system and a UMTS system.

In another embodiment, the handover may be an intra-system handover, such as a handover only between access network devices within a same system, that is, a handover within a serving gateway. For another example, the handover is a handover between serving gateways within a same system. That is, a handover occurs both between access network devices and between serving gateways. For example, in an EPS system shown in FIG. 5, during a handover, a base station interacting with UE 501 may be handed over from a source base station 502 to a target base station 503, and a source serving gateway 505 is handed over to a target serving gateway 506. For one embodiment, a bearer between the base station and an SGW can be handed over from a first bearer 507 (an S1 bearer 1, which corresponds to an eNB 1 and an SGW 1) to a second bearer 508 (an S1 bearer 2, which corresponds to an eNB 2 and an SGW 2). In one example handover procedure, the handover may occur only between access network devices that exchange data with the UE, and no handover occurs between serving gateways. In this example, the source serving gateway 505 and the target serving gateway 506 can be a same serving gateway. For one embodiment, nodes such as the source base station 502, a MEC 504, and the source serving gateway 505 can be bearer nodes before the handover; and the target base station 503, the MEC 504, and the target serving gateway 506 can be bearer nodes after the handover.

Figure 5:
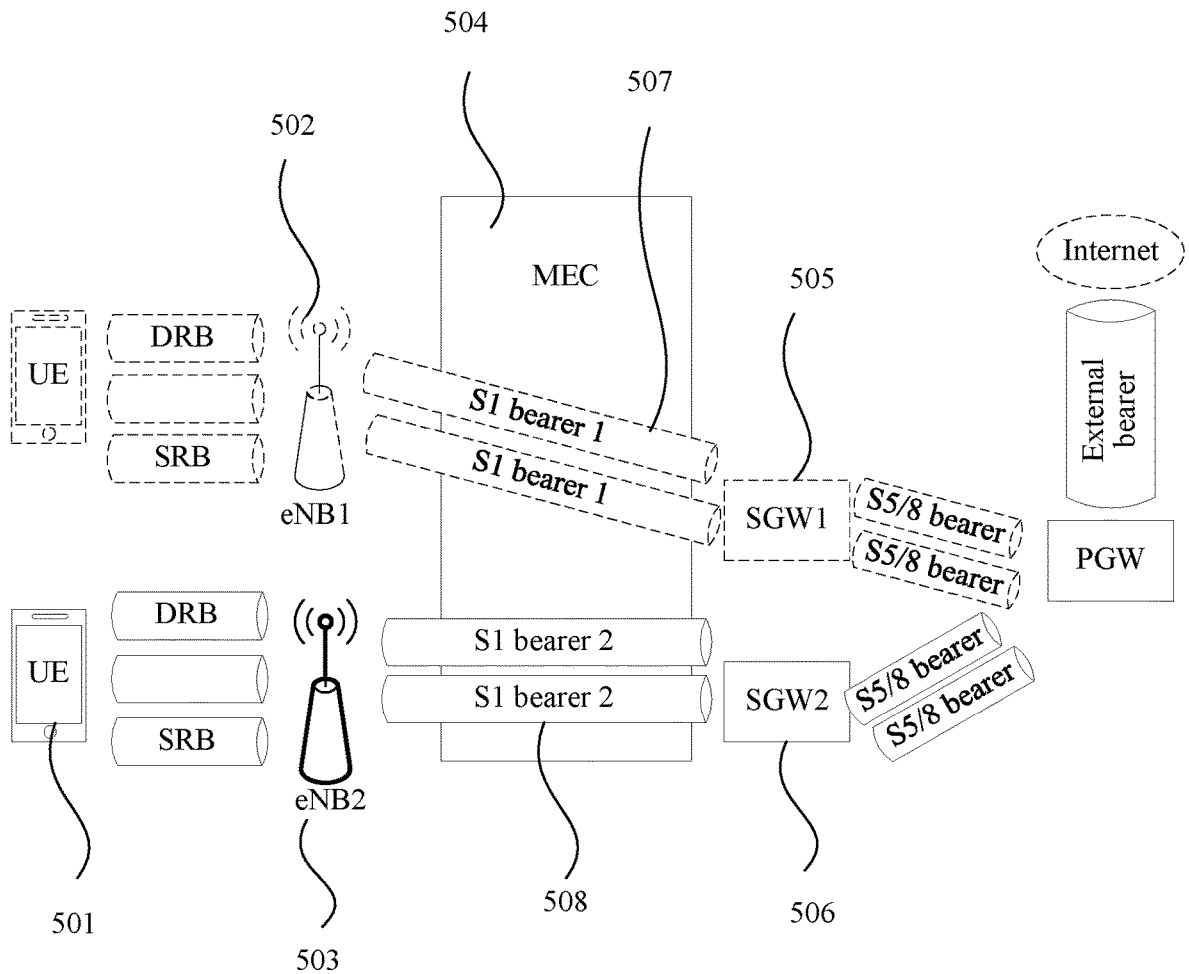
FIG. 5 is a schematic diagram of a handover of UE.

FIG. 5 shows a schematic diagram, and the SGW, the S1 bearer, and the eNB in FIG. 5 are exemplary and not limited to any particular type of operating system, bearer, and base station.

For one embodiment, in a UMTS system, the handover can include a handover to a bearer that is between a base station controller and a serving gateway SGSN that can exchange data with the UE. The disclosed handovers to the UE are examples, which may also be applicable to a handover to another UE.

Referring to the embodiment shown in FIG. 4, at S401, the MEC can obtain a data packet that includes an end marker, where the end marker can be used to indicate that the UE is in a handover procedure. For one embodiment, before the data of the UE is handed over to the second access network device, the first serving gateway may send the data packet that includes the end marker to the first access network device. The end marker can be used to indicate that the data of the UE is in a handover procedure, and the data packet is the last data packet that is sent by using the first bearer. To avoid loss of a data packet, there may be multiple data packets that carry the end marker.

For one embodiment, the data packet that includes the end marker may further carry a TEID of the first bearer. Further, the data packet that includes the end marker may further carry a TEID of the first access network device. For example, as shown in FIG. 5, in a data handover procedure of the UE 501, the source serving gateway 505 may send a data packet that includes an end marker to the source base station 502 by using the first bearer 507, and the data packet that includes the end marker may include a TEID of the source base station 502. The TEID of the first bearer may include the TEID of the first access network device and/or a TEID of the first serving gateway.

For one embodiment, in an EPS system, a structure of the data packet that the end marker may be shown in Table 1.

TABLE 1

| 254 | eNB TEID | ... | IP data packet | ... | ... |

In Table 1, 254 is an identifier of the end marker, and the eNB TEID is the TEID of the first access network device. For one embodiment, when a handover of the UE between serving gateways occurs, S401 may be implemented as follows:

For one example, the first serving gateway can send the data packet that includes the end marker to the first access network device by using the MEC. In this way, the MEC may obtain the data packet that includes the end marker and that is sent by the first serving gateway.

For another example, the first serving gateway can send the data packet that includes the end marker to the MEC.

For one embodiment, when a handover of the UE within a serving gateway occurs, that is, when the serving gateway communicating with the UE remains unchanged and the first serving gateway and the second serving gateway are a same gateway, S401 may be implemented as follows:

For one example, the serving gateway that serves the UE sends the data packet that includes the end marker to the access network device by using the MEC. In this way, the MEC may obtain the end marker sent by the first serving gateway. For another example, the serving gateway that serves the UE can send the data packet that includes the end marker to the MEC.

At S402, the MEC can obtain a bearer identifier of the UE and an identifier of the UE according to the data packet that includes the end marker.

For one embodiment, the bearer identifier of the UE may be an ID for identifying a bearer of the UE. For example, in an EPS system, the bearer identifier may be an EPS bearer ID for identifying an EPS bearer, or an ERAB ID for identifying an ERAB. Alternatively, the bearer identifier of the UE may be a TEID of a bearer of the UE. For one embodiment, the bearer identifier may be the TED of the first bearer, or may be the TED of the first access network device or the TED of the first serving gateway.

For one embodiment, the identifier of the UE can be used to identify the UE. For example, the identifier of the UE may be a UE IP, a cell radio network temporary identifier (C-RNTI), an SAE-Temporary Mobile Subscriber Identity (S-TMSI), an international mobile subscriber identity (IMSI), a UE IP and access point name (APN), or an mobile station international ISDN number (MSISDN), or the like.

For one embodiment, the MEC can store the TEID of the first bearer, which may include the TED of the first access network device and the TED of the first serving gateway. The TED of the first serving gateway may be further determined according to the TEID of the first access network device that is included in the data packet with the end marker.

At S403, the MEC can send a first request message to a node of the second bearer, where the first request message may carry the identifier of the UE and the bearer identifier of the UE, and the request message is used to request information about the second bearer.

For one embodiment, the node of the second bearer may be the second access network device, the second serving gateway, an MME, or a CNIS (core network information service). For an inter-system handover, the node of the second bearer may be a second MME (that is, a target MME or an MME after the handover), or the like.

In addition, the MEC can pre-store an address of the node of the second bearer. For example, the node of the second bearer may be a CNIS, and the CNIS remains unchanged in a handover procedure. The MEC can pre-store an address of the CNIS address. Therefore, the MEC may send the first request message to the CNIS according to the pre-stored address of the CNIS.

At S501, the node of the second bearer can receive the first request message sent by the MEC.

At S502, the node of the second bearer can determine the information regarding the second bearer according to the identifier of the UE and the bearer identifier of the UE that are included in the first request message.

For one embodiment, the node of the second bearer can store the information about the second bearer, and the information about the second bearer can be stored corresponding to the identifier of the UE and the bearer identifier of the UE. After the node of the second bearer receives the first request message sent by the MEC, the node of the second bearer may determine the corresponding information about the second bearer according to the identifier of the UE and the bearer identifier of the UE that are included in the first request message.

At S503, the node of the second bearer can add the information regarding the second bearer to a first response message, and can send the first response message to the MEC.

At S404, the MEC can receive the first response message sent by the node of the second bearer, where the first response message includes the information regarding the second bearer.

For one embodiment, the information regarding the second bearer may be used to determine the second bearer, and may include a TEID of the second access network device and a TEID of the second serving gateway.

At S405, the MEC can store the information regarding the second bearer according to the identifier of the UE and the bearer identifier of the UE. For example, the information about the second bearer may be stored in the memory 303 shown in FIG. 3.

For one embodiment, at S405, a correspondence between the information regarding the second bearer and information regarding the first bearer can be stored according to the information about the second bearer.

The foregoing correspondence includes the information regarding the second bearer. For example, when there is data of UE to be transmitted by using the first bearer, the second bearer is determined according to the foregoing stored information about the second bearer, and the data is transmitted by using the second bearer. For example, in an EPS system, the MEC receives information, regarding a second S1 bearer, that corresponds to the UE and that is sent by the CNIS, and the MEC stores a correspondence between the information regarding the second S1 bearer and information regarding a first S1 bearer. A correspondence, stored on the MEC, of an S1 bearer may be shown in Table 2.

TABLE 2

| UE ID | EPS bearer ID/ERAB ID | Status 1<br>Status 2 | eNB TEID 1<br>eNB TEID 2 | SGW TEID 1<br>SGW TEID 2 | ... <br>... |
|---|---|---|---|---|---|
| ... | ... | ... | ... | ... | ... |

Referring to Table 2, status 1 and status 2 may correspond to before the handover and after the handover. For another example, the information regarding the first bearer can be replaced with the information regarding the second bearer. In this example, the MEC can store information regarding a bearer in one status corresponding to an identifier and a bearer identifier of a same UE. In this way, storage load can be reduced.

For one embodiment, by obtaining a data packet that includes an end marker, the MEC can determine a handover of the UE to a device communicating with the UE occurs, and can obtain corresponding information regarding the second bearer from the node of the second bearer according to information included in the data packet that includes the end marker. Further, the MEC can store the information regarding the second bearer according to the identifier of the UE and the bearer identifier of the UE, and can transmit data of the UE by using the second bearer when data transmission is to be performed by using a bear, thereby ensuring transmission of the data of the UE.

For one embodiment, at S402, the identifier of the UE and the bearer identifier of the UE can be determined according to the TEID of the first bearer, where the identifier of the UE is an IP address of the UE, and the bearer identifier of the UE is the TEID of the first bearer.

For one embodiment, the node of the second bearer may be a core network information service CNIS.

For one embodiment, at S402, the identifier of a node of the first bearer can be determined according to the data packet that includes the end marker. A second request message that includes the TEID of the first bearer can be sent to the node of the first bearer according to the identifier of the node of the first bearer, where the second request message is used to request the identifier of the UE and the bearer identifier of the UE. For one embodiment, a second response message sent by the node of the first bearer can be received, where the second response message includes the identifier of the UE and the bearer identifier of the UE. Further, the node of the first bearer may be the first access network device, such as a source base station or a source RNC, and the node of the second bearer may be the second access network device, such as a target base station or a target RNC. The identifier of the UE may be a cell radio network temporary identifier CRNIT or a temporary mobile subscriber identity S-TMSI.

For one embodiment, when the identifier of the UE is a CRNIT, the first request message further includes an identifier of the first access network device. For another embodiment, the node of the first bearer may be the first serving gateway; and when the handover is a handover between different systems, the first serving gateway is a source SGSN of the UE, and the node of the second bearer is a target MME or a target SGSN of the UE. In another embodiment, when the handover is a handover within a same system, the first severing gateway and the node of the second bearer are both an SGSN that servers the UE.

For one embodiment, the identifier of the UE can be an international mobile subscriber identity (IMSI), an IP address and an access point name (APN) of the UE, or a mobile station international subscriber directory number (MSISDN). For one embodiment, the MEC may pre-store the identifier of the node of the first bearer. For example, the MEC may determine related information of the first bearer according to the TED of the first bearer that is included in the data packet that includes the end marker, and obtain the identifier of the node of the first bearer. Further, the MEC may determine related information of the first access network device according to the TED of the first access network device that is included in the data packet that includes the end marker, and obtain the identifier of the first access network device.

For another embodiment, the MEC may also determine the pre-stored TED of the first bearer according to the TED of the first access network device that is included in the data packet that includes the end marker. The MEC can obtain the TED of the first serving gateway, determine related information of the first serving gateway according to the TED of the first serving gateway. The MEC can also obtain an identifier of the first serving gateway.

For one embodiment, the data packet that includes the end marker further includes an IP address of the first access network device or the first serving gateway. According to the IP address of the first access network device or the first serving gateway, the MEC may determine related information of the first access network device or the first serving gateway and obtain the identifier of the first access network device or the first serving gateway.

In another embodiment, at S403, an identifier of the first serving gateway can be determined by the MEC according to the data packet that includes the end marker. For one embodiment, a third request message that includes the TED of the first bearer can be sent to the first serving gateway according to the identifier of the first serving gateway, where the third request message is used to request an identifier of a node of the first bearer of the UE. A third response message sent by the first serving gateway can be received, where the third response message includes the identifier of the node of the first bearer. A fourth response message that includes the TED of the first bearer can be sent according to the identifier of the node of the first bearer, where the fourth response message is used to request the identifier of the UE and the bearer identifier of the UE. A fourth response message sent by the node of the first bearer can be received, where the fourth response message includes the identifier of the UE and the bearer identifier of the UE.

For one embodiment, the identifier of the UE can be an IMSI, an IP address and an APN of the UE, or an MSISDN. For one embodiment, the first serving gateway may be an SGW. And when the handover is a handover between different systems, the node of the first bearer is a source MME of the UE, the node of the second bearer is a target MME or a target SGSN of the UE. In another embodiment, when the handover is a handover within a same system, the node of the first bearer and the node of the second bearer are both an MME that servers the UE. For one embodiment, the bearer identifier of the UE may be an EPS bearer identifier, or an ERAB identifier, or an S1 bearer identifier. For another embodiment, before the sending a first request message to a node of the second bearer in S404, the MEC can obtain an identifier of the node of the second bearer. For instance, the identifier of the node of the second bearer may be sent by the node of the first bearer to the MEC, for example, added to the second response message or the fourth response message.

For one embodiment, when the handover is a handover between different types of systems, the MEC may determine, according to an identifier of the target access network device that is returned by the source access network device, whether the handover is a handover between different types of systems (protocols used in different systems may be different). The MEC may further perform conversion on identifiers of corresponding devices according to a relationship between the different protocols. The handover between different types of systems can be a handover between systems of different standards. For example, the handover may be a handover between a 3G system and a 4G system or a handover between a 2G system and a 3G system, or may be a handover between a 4G system and a future system. This is not limited herein.

Embodiments disclosed herein can be implemented in different handover scenarios using an example in which a first access network device is a source access network device, a first serving gateway is a source serving gateway, a second access network device is a target access network device, and a second serving gateway is a target serving gateway.

Figure 6:
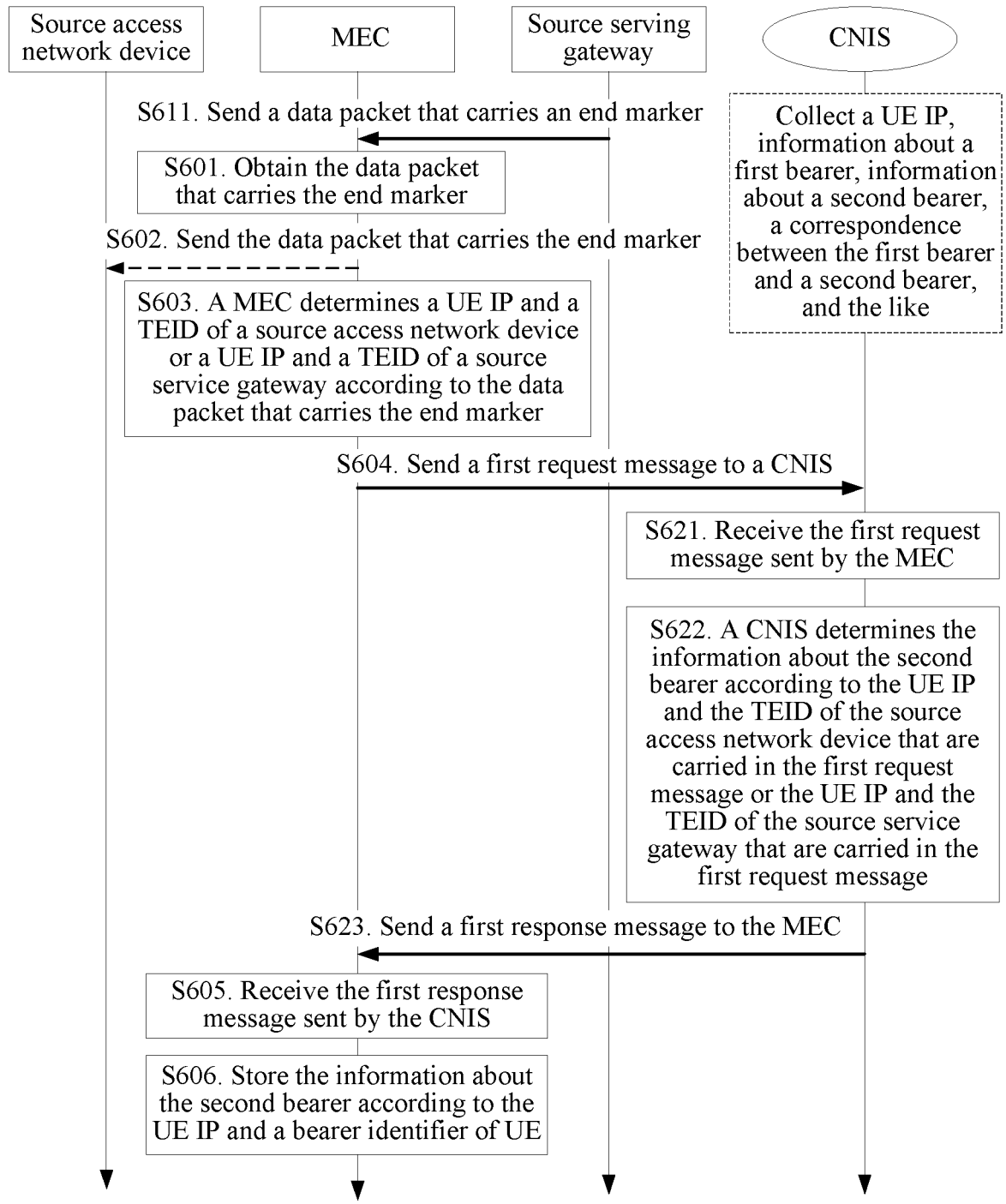
FIG. 6 is a flowchart of a method for determining a bearer for a mobile edge computing according to one embodiment.

FIG. 6 is a flowchart of a method for determining a bearer for a mobile edge computing according to one embodiment. The method of FIG. 6 may be performed by a MEC, such as the apparatus shown in FIG. 3. A program for implementing the method of FIG. 6 may be stored in the memory 303. The processor 301 can read the program stored in the memory and can perform the method of FIG. 6 to send and receive data and an instruction for an external device (for example, the external device may be a source serving gateway, a CNIS, or a source access network device) by using the communication interfaces 302/305.

As shown in FIG. 6, for one embodiment, a node of a second bearer is a CNIS.

For one embodiment, in a handover procedure, the CNIS may collect a UE IP, information about a first bearer, information regarding the second bearer, a correspondence between the first bearer and the second bearer, and the like. The information regarding the first bearer may be used to determine the first bearer, and may include a TEID of a source access network device and a TEID of a source serving gateway. For example, in an EPS system, information collected by the CNIS may be shown in Table 3.

TABLE 3

| Before a handover of UE | UE IP | EPS bearer ID/ERAB ID | eNB TEID1 | SGW TEID1 | ... |
|---|---|---|---|---|---|
| After a handover of UE | UE IP | EPS bearer ID/ERAB ID | eNB TEID2 | SGW TEID2 | ... |
| ... | ... | ... | ... | ... | ... |

At S611, the source serving gateway sends to the source access network device a data packet that includes an end marker by using a MEC.

At S601, the MEC can obtain the data packet that includes the end marker, where the data packet includes a TEID of the first bearer.

For one embodiment, an ID of the first bearer may be a TEID of the source access network device.

Optionally, at S602, the MEC can send to the source access network device the data packet that includes the end marker.

At S603, the MEC can determine a UE IP and a TEID of the source access network device or a UE IP and a TEID of the source serving gateway according to the data packet that includes the end marker.

For example, the MEC may determine the bearer that receives the data packet that includes the end marker, and can determine the data packet transmitted by using the bearer. The MEC can further, determine information related to UE in the data packet, and obtain the UE IP. In addition, the information related to the UE may further include a bearer identifier of the UE. For one embodiment, the MEC may pre-store a data packet corresponding to each bearer.

For one embodiment, information related to the UE may also be extracted from the data packet that includes the end marker to obtain the UE IP. For one embodiment, the TEID of the source access network device may be obtained from the data packet that includes the end marker and that is obtained at S601. For one embodiment, the MEC can store information regarding the first bearer. For example, the MEC may obtain the TEID of the source access network device by using the data packet that includes the end marker and determine information regarding the first bearer that corresponds to the TEID of the source access network device, and obtain the TEID of the source serving gateway.

At S604, the MEC can send a first request message to the CNIS, where the request message includes the UE IP and the TEID of the source access network device or the UE IP and the TEID of the source serving gateway. The first request message can be used to request information regarding the second bearer, that is, information regarding a bearer after a handover.

At S621, the CNIS can receive the first request message sent by the MEC.

At S622, the CNIS can determine the information about the second bearer according to the UE IP and the TEID of the source access network device that are included in the first request message or the UE IP and the TEID of the source serving gateway that are included in the first request message.

For one embodiment, the CNIS service can determine the stored information regarding the second bearer according to content stored in the CNIS and according to the UE IP and the TEID of the source access network device that are included in the first request message sent by the MEC or the UE IP and the TEID of the source serving gateway that are included in the first request message sent by the MEC.

At S623, the CNIS can add the information regarding the second bearer to a first response message, and sends the first response message to the MEC.

At S605, the MEC can receive the first response message returned by the CNIS, where the first response message that includes the information about the second bearer.

At S606, the MEC can store the information regarding the second bearer according to the UE IP and a bearer identifier of UE.

For one embodiment, the bearer identifier of the UE at S606 may be an EPS bearer ID or an ERAB ID. The EPS bearer ID or the ERAB ID may be added by the CNIS to the first response message, and the first response message is sent to the MEC. For another embodiment, the bearer identifier of the UE may also be the TED of the source access network device and/or the TED of the source serving gateway.

For one embodiment, if the handover is a handover within a serving gateway, because no handover occurs on the serving gateway, the MEC can store an address of the serving gateway. In addition, the serving gateway can store the information regarding the second bearer. In this way, the MEC may further use the serving gateway that serves the UE, as the node of the second bearer, and sends the first request message to the serving gateway.

Figure 7A:
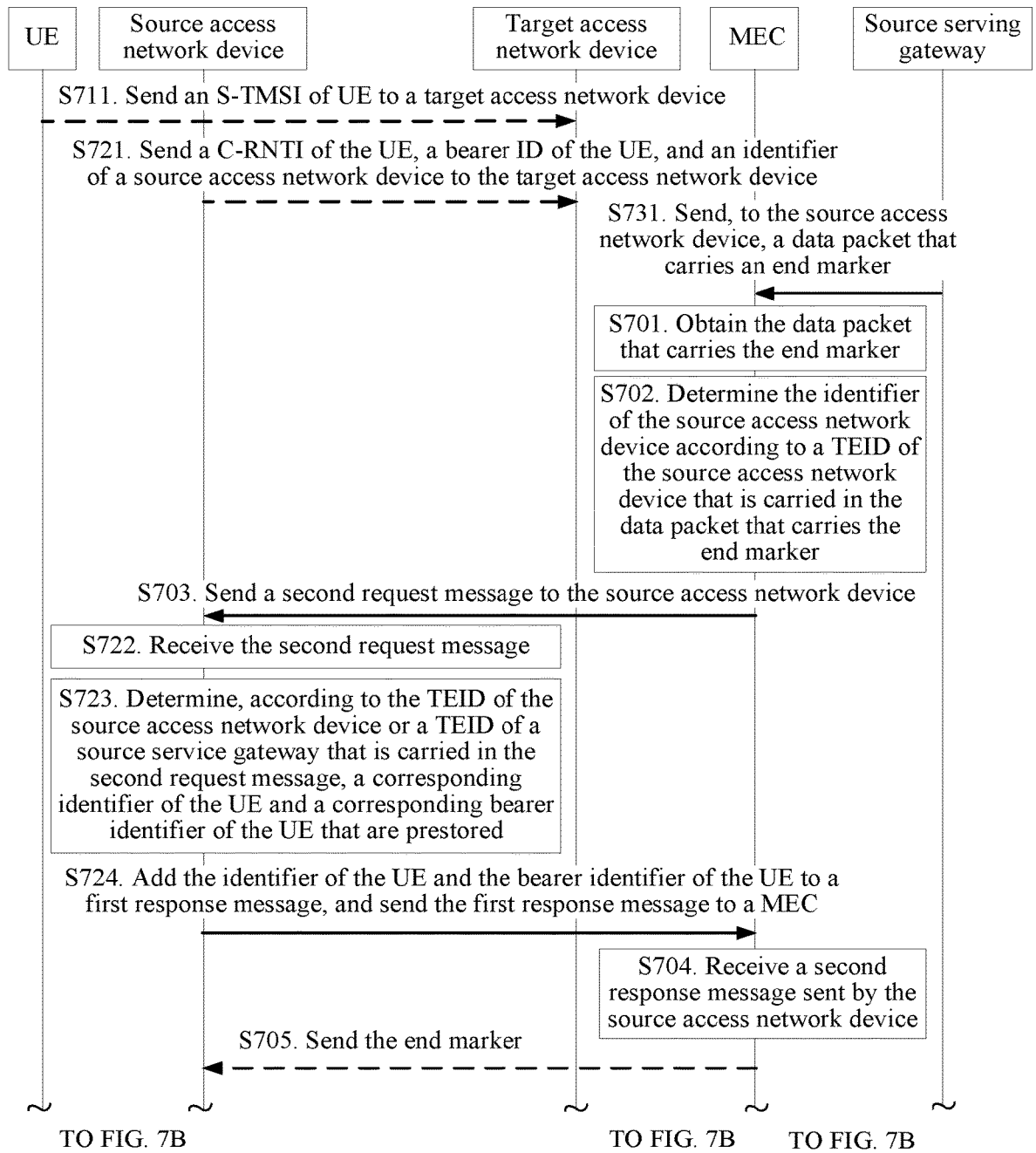
FIG. 7A and FIG. 7B are a flowchart of a method for determining a bearer for a mobile edge computing according to one embodiment.
Figure 7B:
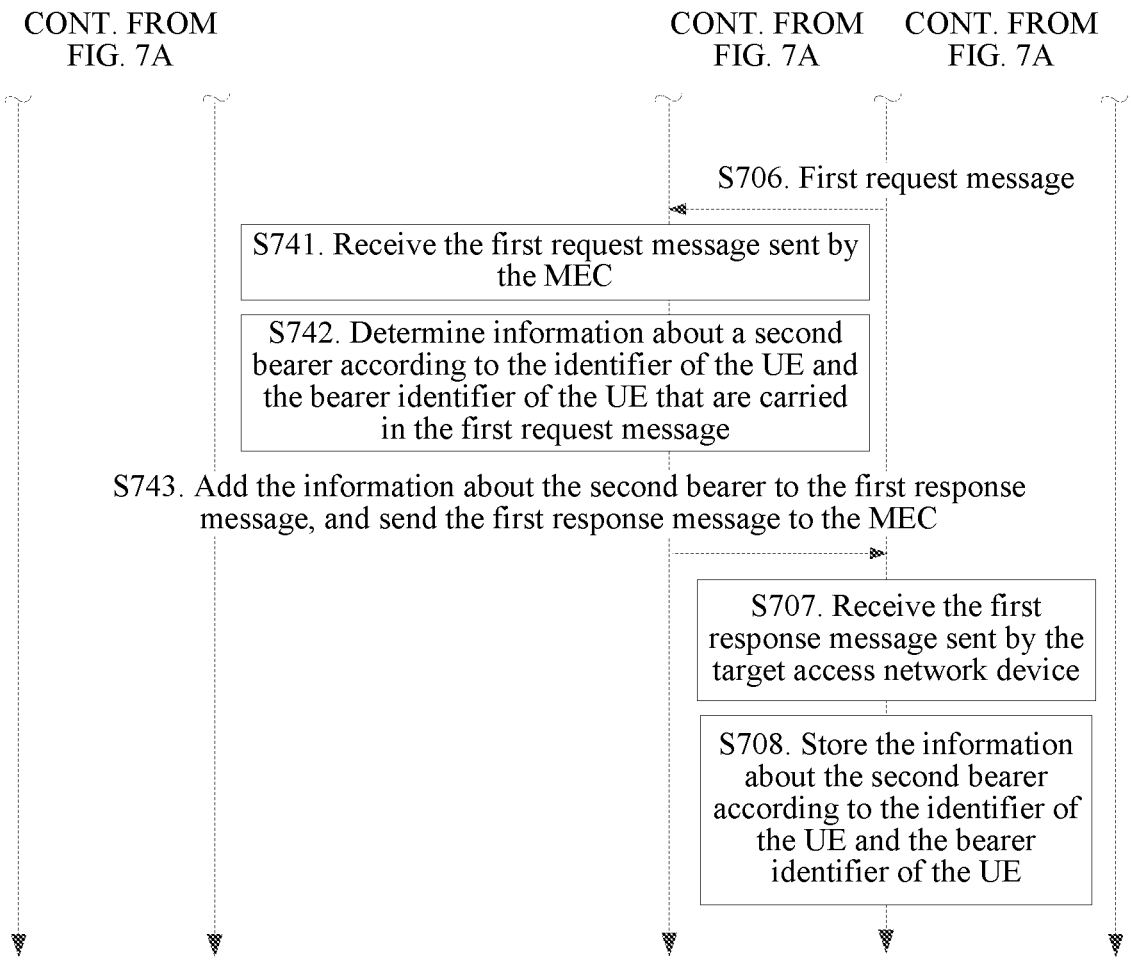

FIGS. 7A-7B is a flowchart of a method for determining a bearer for a mobile edge computing according to one embodiment. The method of FIG. 7A-7B may be performed by a MEC, such as the apparatus shown in FIG. 3. A program for implementing the method embodiment may be stored in the memory 303. The processor 301 can read the program stored in the memory and perform the method of FIG. 7A-7B a to send and receive data and an instruction for an external device (for example, the external device may be a target access network device, a source serving gateway, or a source access network device) by using the communication interfaces 302/305.

As shown in FIG. 7A-7B, embodiments may be applicable to an inter-system or intra-system handover. For one embodiment, a node of a second bearer may be a target access network device, or for a handover outside a serving gateway, a node of a second bearer may be a target serving gateway.

At S731, a source serving gateway can send a data packet that includes an end marker to a source access network device.

At S701, a MEC can obtain the data packet that includes the end marker, where the data packet includes a TED of the source access network device.

At S702, the MEC can determine an identifier of the source access network device according to the TED of the source access network device that is included in the data packet that includes the end marker.

In another embodiment, for a handover outside a serving gateway, the MEC can determine an identifier of the source serving gateway according to the TED of the source access network device.

At S703, the MEC can send a second request message to the source access network device, where the second request message may include the TEID of the source access network device or a TEID of the source serving gateway, and the second request message is used to request an identifier of UE and a bearer identifier of the UE.

In another embodiment, for a handover outside a serving gateway, the MEC can send a second request message to the source serving gateway.

At S722, the source access network device can receive the second request message.

At S723, the source access network device can determine, according to the TEID of the source access network device or the TEID of the source serving gateway that is included in the second request message, the identifier of the UE and the bearer identifier of the UE that are correspondingly pre-stored. For example, the identifier of the UE may be an S-TMSI of the UE or a C-RNTI of the UE, and the bearer identifier of the UE may be a bearer ID of the UE.

Optionally, the source access network device may further determine an identifier of a target access network device according to the second request message.

At S724, the source access network device can add the identifier of the UE and the bearer identifier of the UE to a first response message, and can send the first response message to the MEC. In another embodiment, for a handover outside a serving gateway, S722, S723, and S724 may be further performed by the source serving gateway.

At S704, the MEC can receive a first response message sent by the source access network device. Alternatively, at S704, for a handover outside a serving gateway, the MEC can receive a second response message sent by a source access network device.

Optionally, at S705, the MEC can send the data packet that includes the end marker to the source access network device.

At S706, the MEC can send a first request message to a target access network device, where the request can include the identifier of the UE and the bearer identifier of the UE, and the first request message is used to request information regarding the second bearer. Alternatively, at S706, for a handover outside a serving gateway, the MEC can send a first request message to a target serving gateway.

At S741, the target access network device can receive the first request message sent by the MEC.

At S742, the target access network device can determine the information regarding the second bearer according to the identifier of the UE and the bearer identifier of the UE that are included in the first request message.

For one embodiment, before S731, the method may further include the following steps.

At S711, the UE can send an S-TMSI of the UE to the target access network device.

At S721, the source access network device can send a C-RNTI of the UE, the identifier of the source access network device, and a bearer ID of the UE to the target access network device. For example, the bearer ID of the UE in an EPS system may be an ERAB ID.

At S711 and S721, the target access network device may store the S-TMSI of the UE, the C-RNTI of the UE and the identifier of the source access network device, the bearer ID of the UE, and the like. For example, the target access network device can store the information regarding the second bearer corresponding to the S-TMSI of the UE and the bearer ID of the UE, or store the information regarding the second bearer corresponding to the C-RNTI of the UE, the identifier of the source access network device, and the bearer ID of the UE.

For another example, the target access network device can determine the information regarding the second bearer according to the S-TMSI of the UE and the bearer ID of the UE that are included in the first request message. Optionally, the target access network device can determine the information about the second bearer according to the C-RNTI of the UE, the identifier of the source access network device, and the bearer ID of the UE that are included in the first request message. When the identifier of the UE that is included in the first request message in S706 is the CRNIT of the UE, the first request message may further include the identifier of the source access network device.

At S743, the target access network device can add the information regarding the second bearer to the first response message, and can send the first response message to the MEC. Alternatively, for a handover outside a serving gateway, the target serving gateway may perform S741, S742, and S743.

At S707, the MEC can receive the first response message sent by the target access network device, where the first response message includes the information about the second bearer.

At S708, the information regarding the second bearer can be stored according to the identifier of the UE and the bearer identifier of the UE.

For one embodiment, the source serving gateway or the access network device can be determined according to information that is included in the data packet that includes the end marker, and the identifier of the UE, the bearer identifier of the UE, and the identifier of the node of the corresponding second bearer are requested from the source serving gateway or the access network device. Related information, that is, the information regarding the second bearer, of the UE can be requested from the node of the second bearer by using the identifier of the UE, and then the information regarding the second bearer is stored.

Figure 8A:
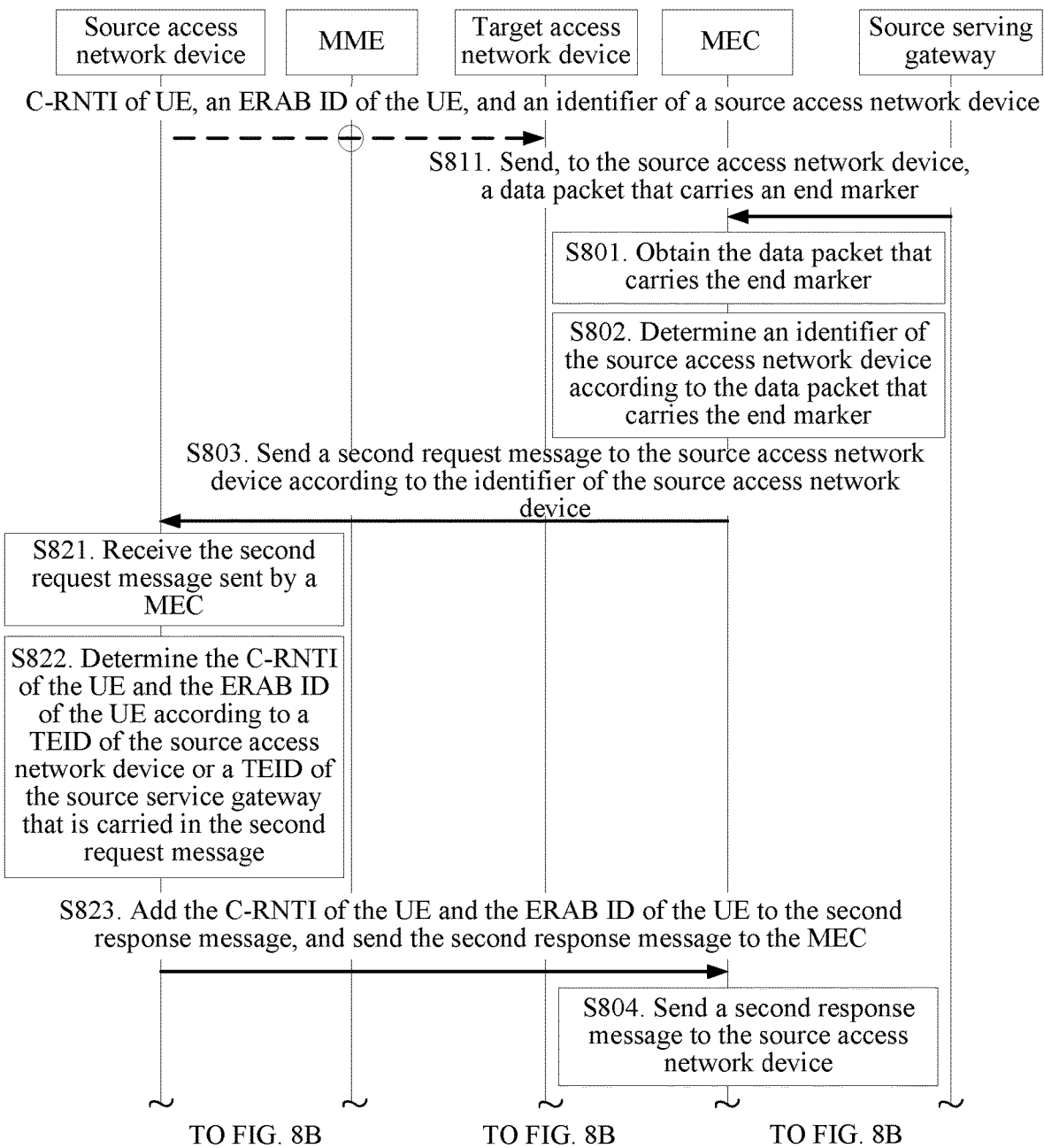
FIG. 8A and FIG. 8B are a flowchart of a method for determining a bearer for a mobile edge computing according to one embodiment.
Figure 8B:
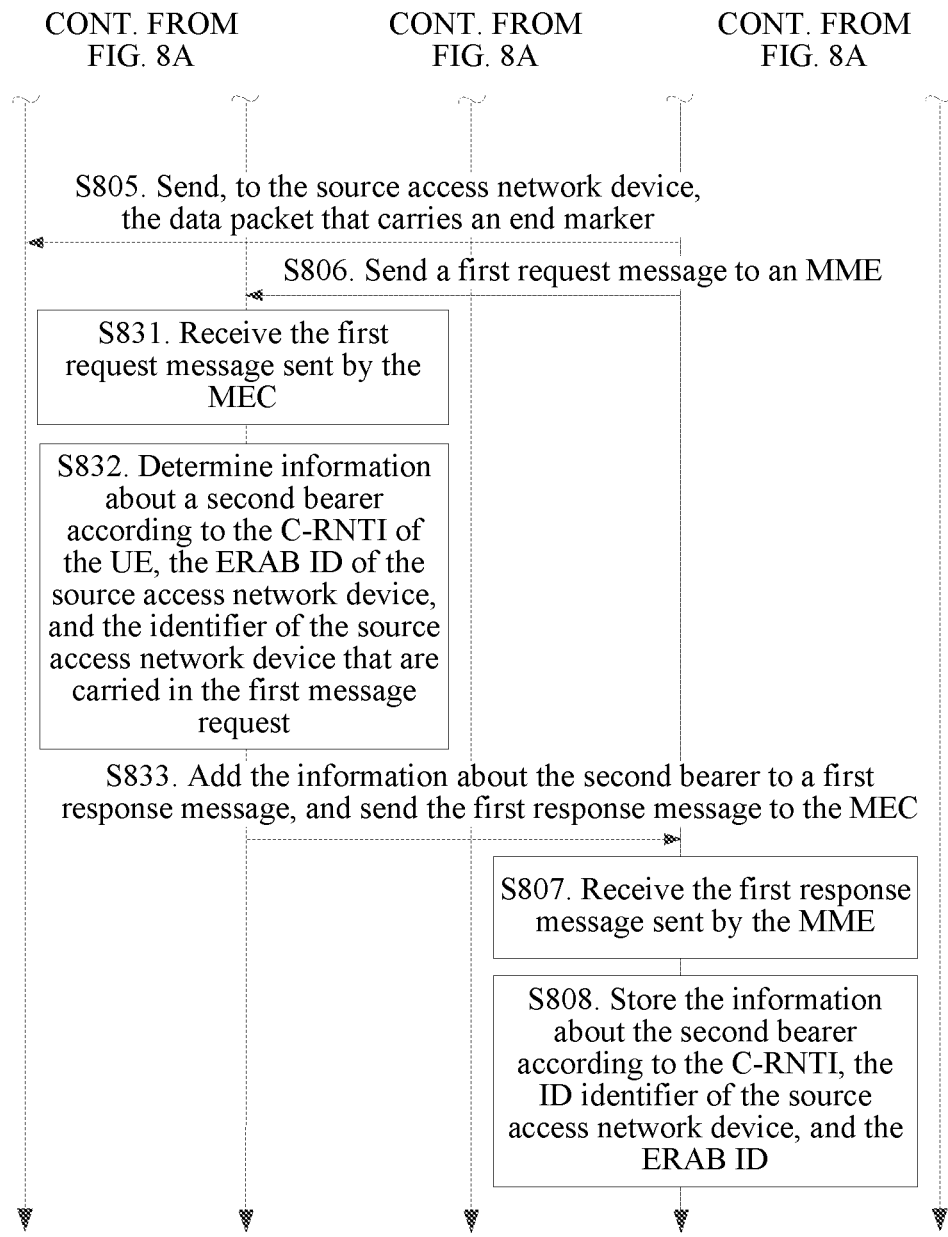

FIGS. 8A-8B is a flowchart of a method for determining a bearer for a mobile edge computing according to one embodiment. The method of FIGS. 8A-8B may be performed by a MEC, such as the apparatus shown in FIG. 3. A program for implementing the method of FIGS. 8A-8B may be stored in the memory 303. The processor 301 can read the program stored in the memory and performs the method of FIGS. 8A-8B to send and receive data and an instruction for an external device (such as a source access network device, an MME, or a target access network device) by using the communication interfaces 302/305.

As shown in FIG. 8A-8B, embodiments can be applicable to an intra-system handover and a node of a second bearer can be an MME.

At S811, a source serving gateway can send a data packet that includes an end marker to a source access network device.

At S801, the MEC can obtain the data packet that includes the end marker, where the data packet includes a TEID of the source access network device.

At S802, the MEC can determine an identifier of the source access network device according to the data packet that includes the end marker.

At S803, the MEC can send a second request message to the source access network device according to the identifier of the source access network device, where the second request message includes the TEID of the source access network device or a TEID of the source serving gateway, and the second request message is used to request a C-RNTI of UE and an ERAB ID of the UE.

At S821, the source access network device can receive the second request message sent by the MEC.

At S822, the source access network device can determine the C-RNTI of the UE and the ERAB ID of the UE according to the TEID of the source access network device or the TEID of the source serving gateway that is included in the second request message.

At S823, the source access network device can add the C-RNTI of the UE and the ERAB ID of the UE to a second response message, and can send the second response message to the MEC.

At S804, the MEC can receive the second response message sent by the source access network device.

At S805, the MEC can send the data packet that includes the end marker to the source access network device.

At S806, the MEC can send a first request message to the MME, where the first request message includes the C-RNTI of the UE, the identifier of the source access network device, and the ERAB ID of the UE, and the first request message can be used to request information regarding the second bearer.

For example, the identifier of the source access network device that is included in the first request message may be the identifier of the source access network device that is determined at S802. Optionally, for the identifier of the source access network device that is included in the first request message, the identifier of the source access network device may be added by the source access network device to the second response message, and the second response message is sent to the MEC. The MEC can obtain the identifier of the source access network device in the second response message.

At S831, the MME can receive the first request message sent by the MEC.

At S832, the MME can determine the information regarding the second bearer according to the C-RNTI of the UE, the identifier of the source access network device, and the ERAB ID of the UE that are included in the first message request.

For one embodiment, in a handover procedure, the source access network device can send data such as the C-RNTI of the UE, the identifier of the source access network device, and the ERAB ID of the UE to the target access network device, and the data, when being sent, is to be forwarded by the MME. In this way, the MME may obtain the data and store the data corresponding to the information regarding the second bearer.

At S833, the MME can add the information about the second bearer to a first response message, and can send the first response message to the MEC.

At S807, the MEC can receive the first response message sent by the MME, where the first response message includes the information regarding the second bearer.

At S808, the MEC can store the information regarding the second bearer according to the C-RNTI, the identifier of the source access network device, and the ERAB ID.

Figure 9A:
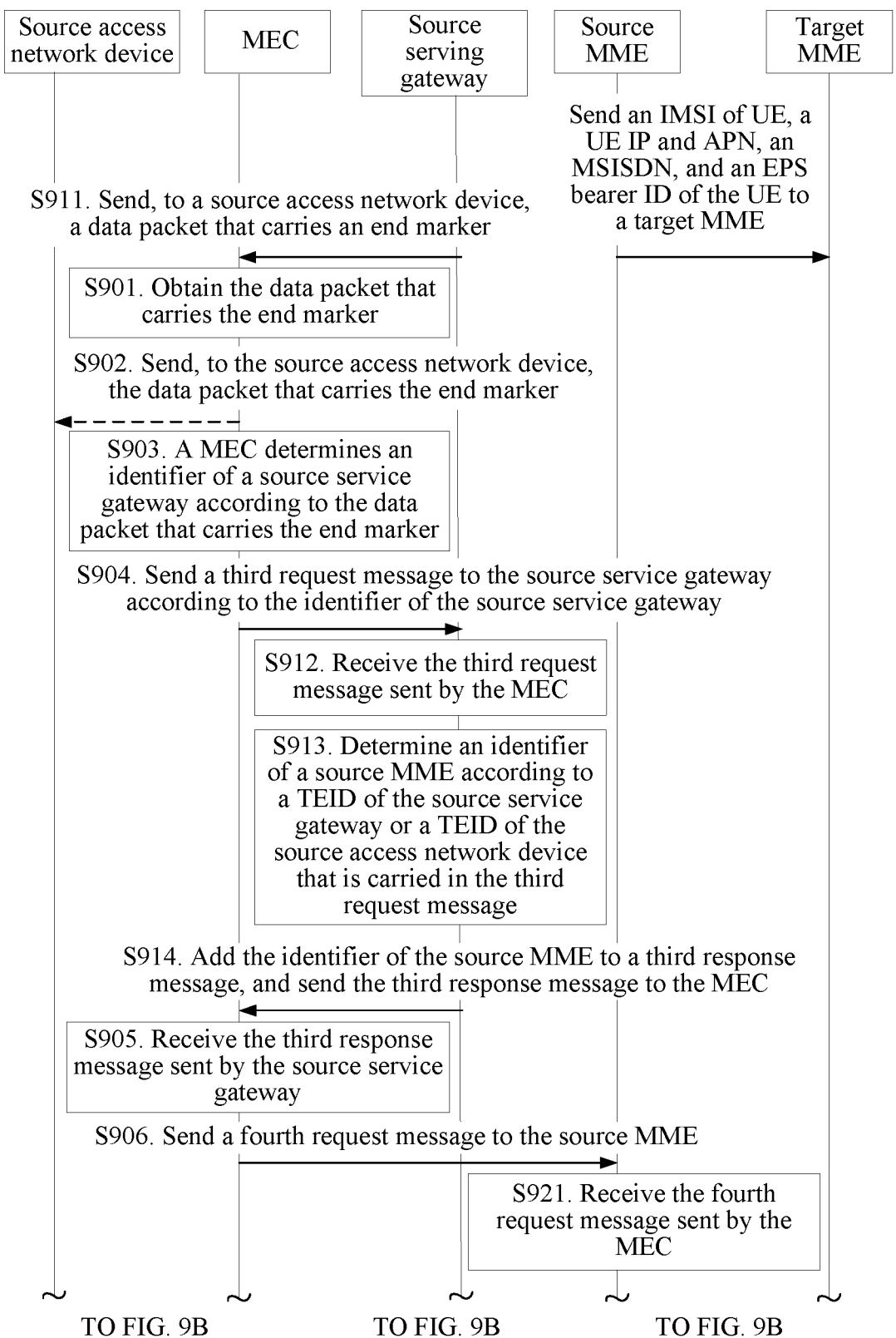
FIG. 9A and FIG. 9B are a flowchart of a method for determining a bearer for a mobile edge computing according to one embodiment.
Figure 9B:
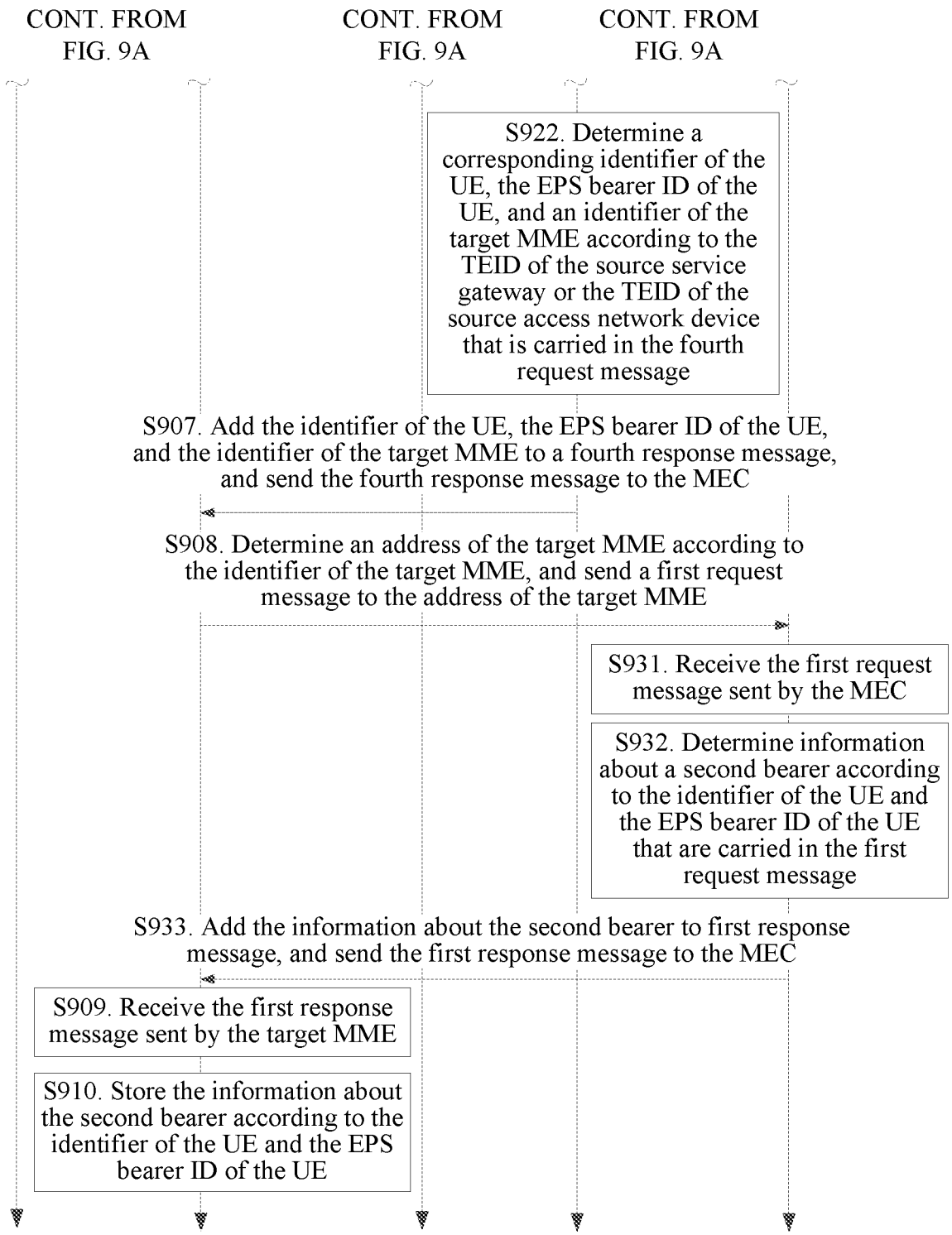

FIGS. 9A-9B is a flowchart of a method for determining a bearer for a mobile edge computing according to one embodiment. The method of FIGS. 9A-9B may be performed by a MEC, such as the apparatus shown in FIG. 3. A program for implementing the method of FIGS. 9A-9B may be stored in the memory 303. The processor 301 can read the program stored in the memory and perform the method of FIGS. 9A-9B to send and receive data and an instruction for an external device (for example, the external device may be a source access network device, a source serving gateway, a source MME, or a target MME) by using the communication interfaces 302/305.

As shown in FIGS. 9A-9B, embodiments can be applicable to an inter-system handover and a handover between MMEs. In this example, an MME communicating with UE is handed over from a first MME (that is, a source MME or an MME before a handover) to a second MME (that is, a target MME or an MME after the handover). Also, in this example, a node of a second bearer is a target MME. For one embodiment, in a handover procedure, the source MME can send an IMSI of UE, a UE IP and APN, or an MSISDN, and an EPS bearer ID of the UE to the target MME.

That is, both the source MME and the target MME can store the IMSI, the UE IP and APN, or the MSISDN of the UE in a handover procedure, and the EPS bearer ID of the UE. The target MME can store information regarding the second bearer (information about a bearer after the handover). The source MME can store an identifier of the target MME.

At S911, a source serving gateway can send a data packet that includes an end marker to a source access network device.

At S901, the MEC can obtain the data packet that includes the end marker, where the data packet includes a TED of the source access network device.

Optionally, at S902, the MEC can send the data packet that includes the end marker to the source access network device.

At S903, the MEC can determine an identifier of the source serving gateway according to the data packet that includes the end marker.

At S904, the MEC can send a third request message to the source serving gateway according to the identifier of the source serving gateway, where the third request message includes a TED of the source serving gateway or the TED of the source access network device, and the third request message is used to request an identifier of the source MME.

At S912, the source serving gateway can receive the third request message sent by the MEC.

At S913, the source serving gateway can determine the identifier of the source MME according to the TED of the source serving gateway or the TED of the source access network device that is included in the third request message.

For one embodiment, the source serving gateway may store the identifier of the target MME, and may store the identifier of the target MME corresponding to information about a first bearer. For example, the identifier of the target MME may be stored corresponding to the TEID of the source serving gateway or the TEID of the source access network device.

At S914, the source serving gateway can add the identifier of the source MME to a third response message, and can send the third response message to the MEC.

At S905, the MEC can receive the third request message sent by the MEC.

At S906, the MEC can find an address of the source MME according to the identifier of the source MME, and can send a fourth request message to the source MME, where the fourth request message includes the TEID of the source serving gateway or the TEID of the source access network device, and the fourth request message is used to request an identifier of the UE, an EPS bearer ID of the UE, and the identifier of the target MME.

At S921, the source MME can receive the fourth request message sent by the MEC.

At S922, the source MME can determine the corresponding identifier of the UE, the EPS bearer ID of the UE, and the identifier of the target MME according to the TEID of the source serving gateway or the TEID of the source access network device that is included in the fourth request message.

For example, the identifier of the UE may be the IMSI of the UE or the MSISDN of the UE, or may be a combination of the UE IP and APN.

At S923, the source MME can add the identifier of the UE, the EPS bearer ID of the UE, and the identifier of the target MME to a fourth response message, and sends the fourth response message to the MEC.

At S907, the MEC can receive the fourth response message returned by the source MME.

At S908, the MEC can determine an address of the target MME according to the identifier of the target MME, and can send a first request message to the address of the target MME.

The first request message can include the identifier of the UE and the EPS bearer ID of the UE that are included in the fourth response message, and the first request message is used to request information about the second bearer of the UE.

At S931, the target MME can receive the first request message sent by the MEC.

At S932, the target MME can determine information regarding the second bearer according to the identifier of the UE and the EPS bearer ID of the UE that are included in the first request message.

For one embodiment, the target MME can store the information regarding the second bearer, and may store the information regarding the second bearer corresponding to the identifier of the UE and the EPS bearer ID of the UE.

At S933, the target MME can add the information regarding the second bearer to first response message, and can send the first response message to the MEC.

At S909, the MEC can receive the first response message sent by the target MME.

At S910, the MEC can store the information about the second bearer according to the identifier of the UE and the EPS bearer ID of the UE.

For one embodiment, the MEC can obtain the data packet that includes the end marker. The MEC can determine that the UE is in a handover procedure, and determine the identifier of the source serving gateway. The MEC can request the identifier of the source MME from the source serving gateway, and request the identifier of the UE, a bearer identifier of the UE, and the identifier of the corresponding target MME from the source MME. Further, the information regarding the second bearer can be requested from the target MME, and the information regarding the second bearer can be stored.

Figure 10:
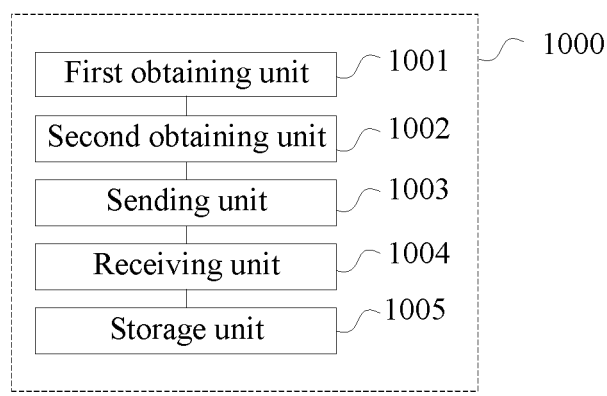
FIG. 10 is a schematic structural diagram of an apparatus for determining a bearer for a mobile edge computing according to one embodiment.

FIG. 10 is a schematic structural diagram of an apparatus for determining a bearer for a mobile edge computing according to one embodiment. The apparatus is mainly configured to implement the foregoing methods for determining a bearer. As shown in FIG. 10, the apparatus may include an apparatus 1000. The apparatus 1000 may include a first obtaining unit 1001, a second obtaining unit 1002, a sending unit 1003, a receiving unit 1004, and a storage unit 1005.

The first obtaining unit 1001 can be configured to obtain a data packet that includes an end marker, where the end marker is used to indicate that UE is in a handover procedure. The second obtaining unit 1002 can be configured to obtain a bearer identifier of the UE and an identifier of the UE according to the data packet that includes the end marker. The sending unit 1003 can be configured to send a first request message to a node of a second bearer, where the request message includes the bearer identifier of the UE and the identifier of the UE, and the request message can be used to request information about the second bearer. The receiving unit 1004 can be configured to receive a first response message sent by the node of the second bearer, where the response message includes the information regarding the second bearer. The storage unit 1005 can be configured to store the information regarding the second bearer according to the identifier of the UE and the bearer identifier of the UE.

For one embodiment, the data packet that includes the end marker further includes a tunnel endpoint identifier TEID of a first bearer. Optionally, the second obtaining unit can be configured to determine the identifier of the UE and the bearer identifier of the UE according to the TEID of the first bearer, where the identifier of the UE is an IP address of the UE, and the bearer identifier of the UE is the tunnel endpoint identifier TEID of the first bearer.

Optionally, the node of the second bearer can be a CNIS.

Further, in an example, the second obtaining unit 1002 may include a first determining subunit, a first sending subunit, and a first receiving subunit.

The first determining subunit can be configured to determine an identifier of a node of a first bearer according to the data packet that includes the end marker.

The first sending subunit can be configured to send a second request message that includes the TEID of the first bearer to the node of the first bearer according to the identifier of the node of the first bearer, where the second request message is used to request the identifier of the UE and the bearer identifier of the UE.

The first receiving subunit can be configured to receive a second response message sent by the node of the first bearer, where the second response message includes the identifier of the UE and the bearer identifier of the UE. Optionally, the node of the first bearer can be a first access network device, and the node of the second bearer is the second access network device. Optionally, the identifier of the UE can be a CRNIT or an S-TMSI.

Further, when the identifier of the UE is a CRNIT, the first request message can further include an identifier of the first access network device. Optionally, the node of the first bearer can be a first serving gateway.

For one embodiment, when the handover is a handover between different systems, the first serving gateway can be a source SGSN of the UE, and the node of the second bearer can be a target MME or a target SGSN of the UE. For another embodiment, when the handover is a handover within a same system, the first serving gateway and the node of the second bearer can both be an SGSN that serves the UE. Optionally, the identifier of the UE can be an IMSI, an IP address and an APN of the UE, or an MSISDN.

In another example, the second obtaining unit 1002 may further include a second determining subunit, a second sending subunit, a second receiving subunit, a third sending subunit, and a third receiving subunit.

The second determining subunit can be configured to determine an identifier of a first serving gateway according to the data packet that includes the end marker. The second sending subunit can be configured to send a third request message that includes the TEID of the first bearer to the first serving gateway according to the identifier of the first serving gateway, where the third request message is used to request an identifier of a node of the first bearer. The second receiving unit can be configured to receive a third response message sent by the first serving gateway, where the third response message includes the identifier of the node of the first bearer. The third sending subunit can be configured to send, according to the identifier of the node of the first bearer, a fourth response message that includes the TEID of the first bearer, where the fourth response message is used to request the identifier of the UE and the bearer identifier of the UE. The third receiving subunit can be configured to receive a fourth response message sent by the node of the first bearer, where the fourth response message includes the identifier of the UE and the bearer identifier of the UE. The identifier of the UE can be an IMSI, an IP address and an APN of the UE, or an MSISDN. Optionally, the first serving gateway can be an SGW.

For one embodiment, when the handover is a handover between different systems, the node of the first bearer can be a source MME of the UE, the node of the second bearer can be a target MME or a target SGSN of the UE. For another embodiment, when the handover is a handover within a same system, the node of the first bearer and the node of the second bearer can both be an MME that serves the UE. Optionally, the bearer identifier of the UE can be an EPS bearer identifier, or an ERAB identifier, or an S1 bearer identifier. Optionally, before the MEC sends the first request message to the node of the second bearer, the apparatus can further include a third obtaining unit configured to obtain an identifier of the node of the second bearer. Optionally, the first serving gateway and a second serving gateway can be a same serving gateway.

The apparatus shown in FIG. 10 is configured to implement the methods shown in FIG. 4, FIG. 6, FIG. 7A-7B, FIGS. 8A-8B, and FIGS. 9A-9B In the embodiments disclosed herein, the MEC can obtain the data packet that includes the end marker, to determine that a handover to an access network device of the UE occurs, and obtains, from a bearer node after the handover, the information about the corresponding second bearer according to a bearer TEID included in the data packet that includes the end marker. Alternatively, the MEC can request the identifier of the UE and the identifier of the node of second bearer corresponding to the UE from the node of the first bearer, and requests related information of the UE from the node of the second bearer by using the identifier of the UE, to determine the information about the second bearer. In this way, the second bearer can be used to transmit data when data transmission is to be performed by using the first bearer.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing detailed description, the disclosed embodiments are merely examples, which are not intended to be limiting. Modifications can be made to the disclosed embodiments without departing from the scope of the appended claims.

What is claimed is:

1. A method for determining a bearer for mobile edge computing (MEC), wherein the method is applied to a handover procedure of user equipment (UE) from a first access network device to a second access network device, wherein data of the UE is handed over from a first bearer between the first access network device and a first serving gateway to a second bearer between the second access network device and a second serving gateway, and the method comprises:
    obtaining a data packet that includes an end marker, wherein the end marker is used to indicate that the UE is in a handover procedure;
    obtaining a bearer identifier of the UE and an identifier of the UE according to the data packet that includes the end marker;
    sending a first request message to a node of the second bearer, wherein the first request message includes the bearer identifier of the UE and the identifier of the UE, and the first request message is used to request information about the second bearer;
    receiving a first response message from the node of the second bearer, wherein the first response message includes the information regarding the second bearer; and
    storing the information regarding the second bearer according to the identifier of the UE and the bearer identifier of the UE.

2. The method according to claim 1, wherein the data packet that includes the end marker further includes a tunnel endpoint identifier (TEID) of the first bearer.

3. The method according to claim 2, wherein the obtaining the bearer identifier of the UE and the identifier of the UE according to the data packet that includes the end marker comprises:
    determining the identifier of the UE and the bearer identifier of the UE according to the TEID of the first bearer, wherein the identifier of the UE is an Internet Protocol (IP) address of the UE, and the bearer identifier of the UE is the TEID of the first bearer.

4. The method according to claim 3, wherein the node of the second bearer is a core network information service (CNIS).

5. The method according to claim 2, wherein the obtaining the bearer identifier of the UE and an identifier of the UE according to the data packet that includes the end marker comprises:
    determining an identifier of a node of the first bearer according to the data packet that includes the end marker;

sending a second request message that includes the TEID of the first bearer to the node of the first bearer according to the identifier of the node of the first bearer, wherein the second request message is used to request the identifier of the UE and the bearer identifier of the UE; and receiving a second response message from the node of the first bearer, wherein the second response message includes the identifier of the UE and the bearer identifier of the UE.

6. The method according to claim 5, wherein the node of the first bearer is the first serving gateway; and when the handover is a handover between different systems, the first serving gateway is a source serving general packet radio service (GPRS) support node (SGSN) of the UE, and the node of the second bearer is a target mobility management entity (MME) or a target SGSN of the UE; or when the handover is a handover within a same system, the first serving gateway and the node of the second bearer are both an SGSN that serves the UE.

7. The method according to claim 5, wherein the bearer identifier of the UE is an evolved packet system (EPS) bearer identifier, or an evolved-universal mobile telecommunications service (UMTS) terrestrial radio access network (E-UTRAN) radio access bearer (ERAB) bearer identifier, or an S1 bearer identifier.

8. The method according to claim 2, wherein the obtaining the bearer identifier of the UE and the identifier of the UE according to the data packet that includes the end marker comprises:

determining an identifier of the first serving gateway according to the data packet that includes the end marker;

sending a third request message that includes the TEID of the first bearer to the first serving gateway according to the identifier of the first serving gateway, wherein the third request message is used to request an identifier of a node of the first bearer;

receiving a third response message from the first serving gateway, wherein the third response message includes the identifier of the node of the first bearer;

sending a fourth response message that includes the TEID of the first bearer according to the identifier of the node of the first bearer, wherein the fourth response message is used to request the identifier of the UE and the bearer identifier of the UE; and receiving the fourth response message from the node of the first bearer, wherein the fourth response message includes the identifier of the UE and the bearer identifier of the UE, wherein the identifier of the UE is an international mobile subscriber identity (IMSI), an Internet Protocol (IP) address and an access point name (APN) of the UE, or a mobile station international subscriber directory number (MSISDN).

9. The method according to claim 8, wherein the first serving gateway is a serving gateway (SGW); and when the handover is a handover between different systems, the node of the first bearer is a source MME of the UE, the node of the second bearer is a target MME or a target SGSN of the UE; or when the handover is a handover within a same system, the node of the first bearer and the node of the second bearer are both an MME that serves the UE.

10. The method according to claim 1, wherein the first serving gateway and the second serving gateway are a same serving gateway.

11. An apparatus for determining a bearer, comprising:
a processor,
a memory, a communications interface, and
a bus, wherein the processor, the memory, and the communications interface communicate by using the bus and the communications interface is configured to communicate with user equipment (UE), a first access network device, a second access network device, a first serving gateway, a second serving gateway, a node of a first bearer, or a node of a second bearer; the memory is configured to store a program; and the processor is configured to execute the program stored in the memory and to:

obtain a data packet that includes an end marker, wherein the end marker is used to indicate that the UE is in a handover procedure;

obtain a bearer identifier of the UE and an identifier of the UE according to the data packet that includes the end marker;

send a first request message to a node of the second bearer, wherein the first request message includes the bearer identifier of the UE and the identifier of the UE, and the first request message is used to request information about the second bearer;

receive a first response message from the node of the second bearer, wherein the first response message includes the information regarding the second bearer; and store the information regarding the second bearer according to the identifier of the UE and the bearer identifier of the UE.

12. The apparatus according to claim 11, wherein the data packet that includes the end marker further includes a tunnel endpoint identifier (TEID) of the first bearer.

13. The apparatus according to claim 12, wherein processor is further configured to:

determine the identifier of the UE and the bearer identifier of the UE according to the TEID of the first bearer, wherein the identifier of the UE is an Internet Protocol (IP) address of the UE, and the bearer identifier of the UE is the TEID of the first bearer.

14. The apparatus according to claim 13, wherein the node of the second bearer is a core network information service (CNIS).

15. The apparatus according to claim 12, wherein the processor is further configured to:

determine an identifier of a node of the first bearer according to the data packet that includes the end marker;

send a second request message that includes the TEID of the first bearer to the node of the first bearer according to the identifier of the node of the first bearer, wherein the second request message is used to request the identifier of the UE and the bearer identifier of the UE; and receive a second response message from the node of the first bearer, wherein the second response message includes the identifier of the UE and the bearer identifier of the UE.

16. The apparatus according to claim 15, wherein the node of the first bearer is the first access network device, and the node of the second bearer is the second access network device.

17. The apparatus according to claim 15, wherein the node of the first bearer is the first serving gateway; and when the handover is a handover between different systems, the first serving gateway is a source serving general packet radio service (GPRS) support node (SGSN) of the UE, and the node of the second bearer is a target mobility management entity (MME) or a target SGSN of the UE; or when the handover is a handover within a same system, the first serving gateway and the node of the second bearer are both an SGSN that serves the UE.

18. The apparatus according to claim 12, wherein the processor is further configured to:
  determine an identifier of the first serving gateway according to the data packet that includes the end marker;
  send a third request message that includes the TEID of the first bearer to the first serving gateway according to the identifier of the first serving gateway, wherein the third request message is used to request an identifier of a node of the first bearer;
  receive a third response message from the first serving gateway, wherein the third response message includes the identifier of the node of the first bearer;
  send a fourth response message that includes the TEID of the first bearer according to the identifier of the node of the first bearer, wherein the fourth response message is used to request the identifier of the UE and the bearer identifier of the UE; and
  receive a fourth response message from the node of the first bearer, wherein the fourth response message includes the identifier of the UE and the bearer identifier of the UE, wherein the identifier of the UE is an international mobile subscriber identity (IMSI), an Internet Protocol (IP) address and an access point name (APN) of the UE, or a mobile station international subscriber directory number (MSISDN).

19. The apparatus according to claim 18, wherein the first serving gateway is a serving gateway (SGW); and when the handover is a handover between different systems, the node of the first bearer is a source MME of the UE, the node of the second bearer is a target MME or a target SGSN of the UE; or when the handover is a handover within a same system, the node of the first bearer and the node of the second bearer are both an MME that serves the UE.

20. The apparatus according to claim 11, wherein the first serving gateway and the second serving gateway are a same serving gateway.

* * * * *